US012675763B2

(12) United States Patent
Yuksel et al.

(10) Patent No.: US 12,675,763 B2
(45) Date of Patent: Jul. 7, 2026

(54) MULTI-AGENT ARTIFICIAL INTELLIGENCE SYSTEM FOR AUTONOMOUS BUSINESS INSIGHT EXTRACTION

(71) Applicant: Aixplain, Inc., San Jose, CA (US)

(72) Inventors: Kamer Ali Yuksel, Munich (DE); Hassan Sawaf, San Jose, CA (US)

(73) Assignee: Aixplain, Inc., San Jose, CA (US)

( * ) Notice: Subject to any disclaimer, the term of this patent is extended or adjusted under 35 U.S.C. 154(b) by 0 days.

(21) Appl. No.: 19/394,084

(22) Filed: Nov. 19, 2025

(65) Prior Publication Data

US 2026/0141334 A1    May 21, 2026

Related U.S. Application Data

(60) Provisional application No. 63/722,231, filed on Nov. 19, 2024.

(51) Int. Cl.
*G06F 7/00* (2006.01)
*G06Q 10/067* (2023.01)

(52) U.S. Cl.
CPC ................................. *G06Q 10/067* (2013.01)

(58) Field of Classification Search
CPC .. G06F 16/214; G06F 16/215; G06F 16/2329; G06F 16/9577; G06F 16/953; G06F 16/288; G06F 16/2237; G06F 16/285; G06F 16/9538; G06F 16/9038; G06F 16/338; G06F 16/9535; G06F 16/248; G06F 16/243; G06F 16/26; G06F 16/24522; G06F 16/3347; G06F 16/3344;

G06F 16/332; G06F 16/3322; G06F 16/35; G06F 16/2456; G06F 16/2465; G06F 16/2471; G06F 16/24575; G06F 16/24578; G06F 16/2453;
(Continued)

(56) References Cited

U.S. PATENT DOCUMENTS

| | | | | |
|---|---|---|---|---|
| 10,747,651 | B1 * | 8/2020 | Vanderwall | ......... G06F 11/3684 |
| 11,010,284 | B1 * | 5/2021 | Santiago | ................ G06N 20/00 |

(Continued)

*Primary Examiner* — Mohammad A Sana
(74) *Attorney, Agent, or Firm* — FP; Sikander M. Khan

(57) ABSTRACT

A computer-implemented method autonomously generates, validates, and refines business insights from structured data tables stored in one or more databases. Schema information describing the structured data tables is received and used to automatically generate a plurality of candidate business insight hypotheses without relying on natural-language queries. For each hypothesis, corresponding structured queries are generated and executed to obtain query results indicating whether the hypothesis is supported or refuted. Execution failures or inconsistencies are detected and used to automatically refine queries or hypotheses and re-execute refined queries. Query results from successfully executed queries are aggregated into validated insight data. A large language model generates textual interpretations describing business implications of validated hypotheses, and visualization code renders visualizations of the validated insight data. A business insight report is compiled and the constituent insights are scored across multiple dimensions, with feedback used to refine subsequent executions over multiple iterations.

20 Claims, 22 Drawing Sheets

(58) Field of Classification Search
CPC .. G06F 16/2457; G06Q 10/067; G06Q 10/10;
G06Q 10/06332
See application file for complete search history.

(56) References Cited

U.S. PATENT DOCUMENTS

| | | | |
|---|---|---|---|
| 2016/0026634 A1* | 1/2016 | Allen | G06F 40/20 |
| | | | 707/740 |
| 2025/0258855 A1* | 8/2025 | Ustyuzhanin | G06F 16/3322 |

* cited by examiner

100

Ingest Schema
302

Generate Hypotheses
304

Execute SQL queries
306

Detect Errors
308

Debug/Refine
310

Aggregate Results
312

Generate Visualizations
314

Compile Report
316

Evaluate Feedback
318

802 — LLM Interpretation, Visualization Selection, and Visualization Script Generation 804 — Report Generation 806 — Validated Hypotheses
SQL Queries
Visualizations
Interpretations
Recommendations 808 — Script Generator
Script Repository

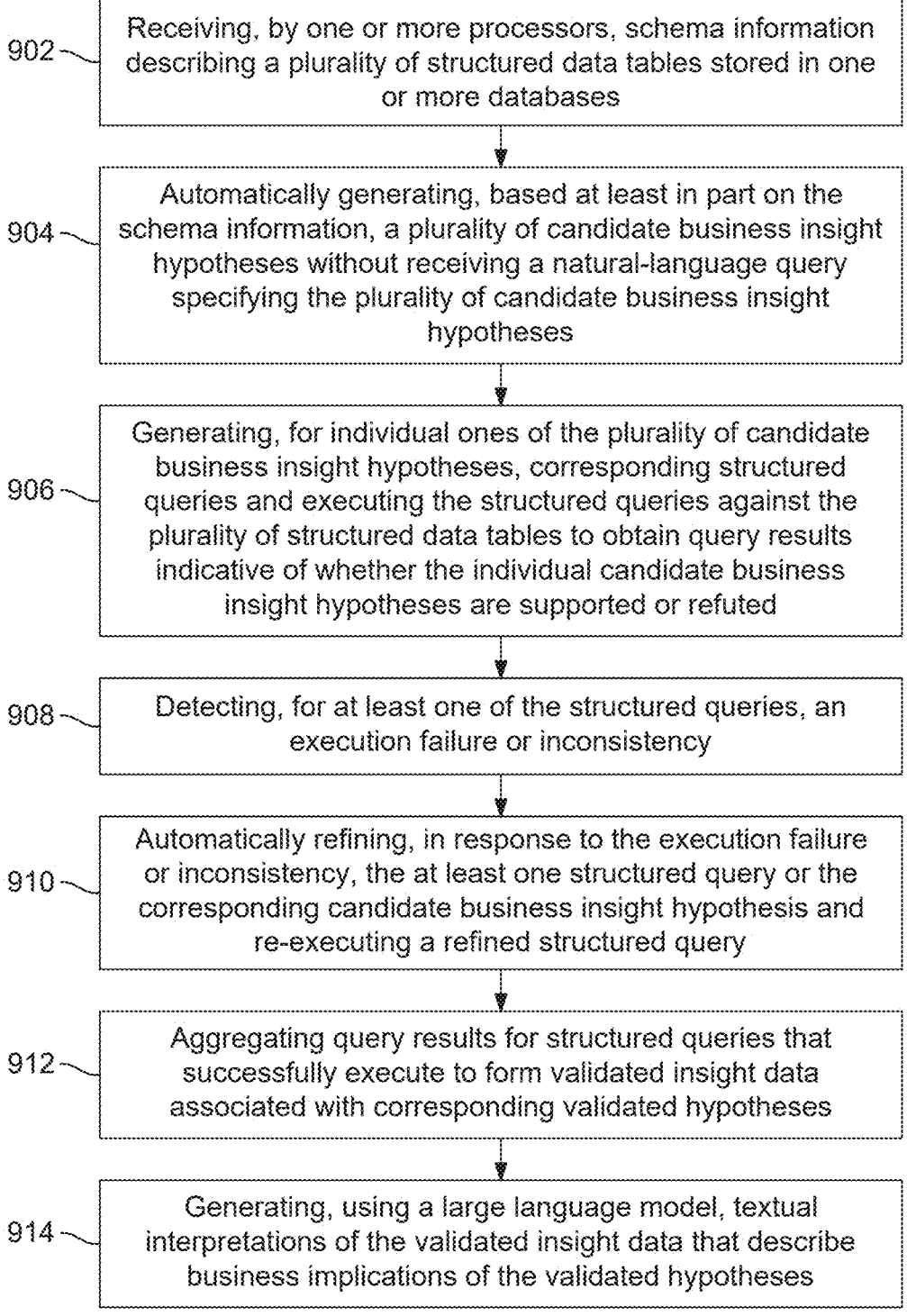

902 — Receiving, by one or more processors, schema information describing a plurality of structured data tables stored in one or more databases 904 — Automatically generating, based at least in part on the schema information, a plurality of candidate business insight hypotheses without receiving a natural-language query specifying the plurality of candidate business insight hypotheses 906 — Generating, for individual ones of the plurality of candidate business insight hypotheses, corresponding structured queries and executing the structured queries against the plurality of structured data tables to obtain query results indicative of whether the individual candidate business insight hypotheses are supported or refuted 908 — Detecting, for at least one of the structured queries, an execution failure or inconsistency 910 — Automatically refining, in response to the execution failure or inconsistency, the at least one structured query or the corresponding candidate business insight hypothesis and re-executing a refined structured query 912 — Aggregating query results for structured queries that successfully execute to form validated insight data associated with corresponding validated hypotheses 914 — Generating, using a large language model, textual interpretations of the validated insight data that describe business implications of the validated hypotheses

FIG. 9

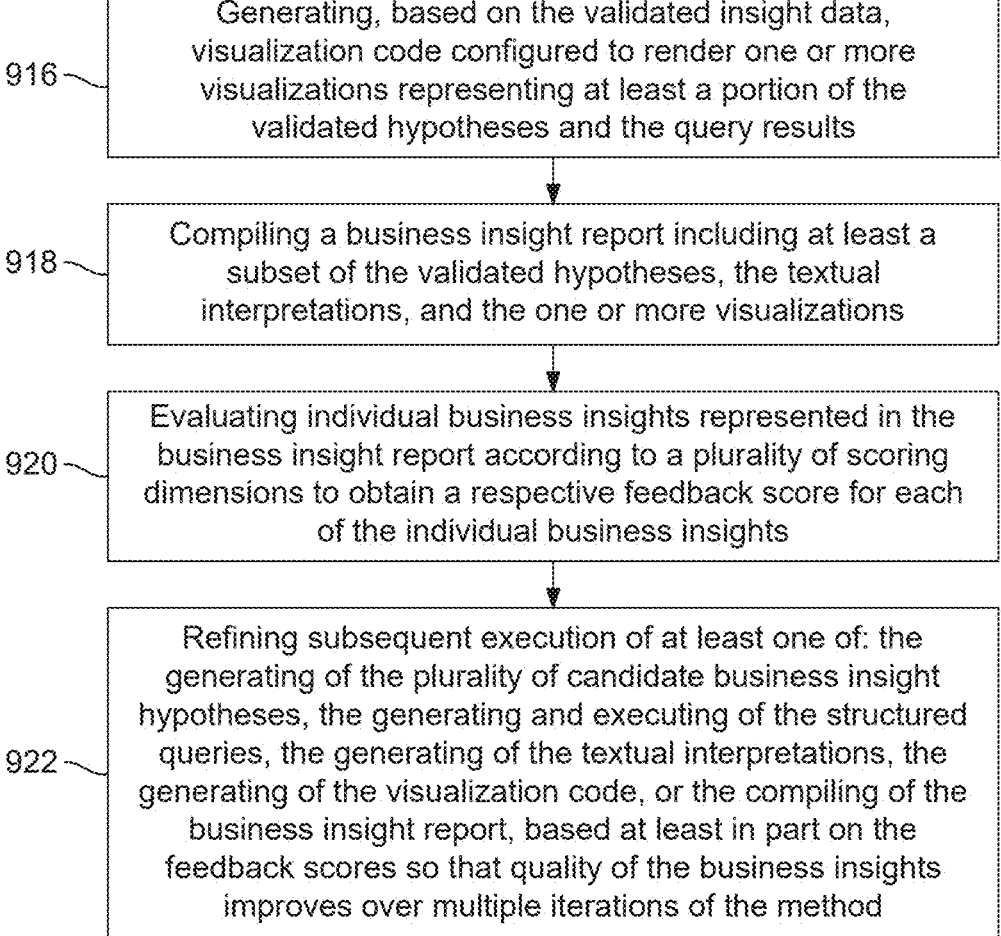

916 — Generating, based on the validated insight data, visualization code configured to render one or more visualizations representing at least a portion of the validated hypotheses and the query results 918 — Compiling a business insight report including at least a subset of the validated hypotheses, the textual interpretations, and the one or more visualizations 920 — Evaluating individual business insights represented in the business insight report according to a plurality of scoring dimensions to obtain a respective feedback score for each of the individual business insights 922 — Refining subsequent execution of at least one of: the generating of the plurality of candidate business insight hypotheses, the generating and executing of the structured queries, the generating of the textual interpretations, the generating of the visualization code, or the compiling of the business insight report, based at least in part on the feedback scores so that quality of the business insights improves over multiple iterations of the method

FIG. 9 (Cont'd)

Inference Logic
1000

Inference Logic
1000

```
batch_size = tf.shape (x) [0]

x = self.rescale(x)

patches = self.extract_patches (x)

x = self.patch_proj (patches)

class_emb = tf.broadcast_to(
    self.class_emb, [batch_size, 1, self.d_model]
)

x = tf.concat([class_emb, x], axis=1)

x = x + self.pos_emb for layer in self.enc_layers:
    x = layer (x, training)

return  self.mlp_head(x[:, 0])
```

FIG. 19

MULTI-AGENT ARTIFICIAL INTELLIGENCE SYSTEM FOR AUTONOMOUS BUSINESS INSIGHT EXTRACTION

This document is a United States Non-provisional utility patent application under statute 35 U.S.C. 111(A). This document claims priority and benefit to a U.S. Provisional utility patent application that is identified by a Ser. No. 63/722,231 and that is titled "Multi-AI Agent System for End-to-End Autonomous Business Insight Extraction via Hypothesis Generation, Validation, and Reporting from Structured Databases", and that was filed with the U.S. Patent and Trademark Office (USPTO) on Nov. 19, 2024. The above-referenced document is herein incorporated by reference in its entirety.

TECHNICAL FIELD

The present disclosure relates generally to the field of data processing and business intelligence, and more specifically, to systems and methods for autonomously generating, validating, and refining business insights from structured datasets using automated analytical workflows.

BACKGROUND

Business intelligence and data analytics have undergone significant development over the past decades, moving from manually crafted reports and spreadsheets to highly automated dashboards and self-service analytics platforms. Each progression has increased the ability of organizations to collect, store, and visualize large volumes of data, and can be seen in domains such as financial analytics, customer relationship management, supply chain monitoring, and operational performance tracking. Modern enterprises commonly maintain extensive structured datasets in relational databases, data warehouses, and cloud-based data platforms, including tables that describe employees, projects, allocations, transactions, assets, and other business entities.

As the volume and heterogeneity of structured data have increased, a variety of tools have emerged to help users query and analyze such data. These tools include business intelligence platforms, natural-language-to-SQL interfaces, and, more recently, systems that employ large language models (LLMs) to assist with query formulation, result summarization, and chart generation. While such tools have improved accessibility to data, users may still be burdened with manually defining analytical questions, crafting or validating the corresponding queries, interpreting numerous result sets, and assembling coherent business reports suitable for decision makers.

In many organizations, business analysts and domain experts continue to rely on manual workflows to generate insights from structured data. They typically formulate individual hypotheses about utilization, cost, risk, or performance; translate these hypotheses into structured queries; execute and debug the queries; interpret the resulting tables or charts; and, finally, create narrative reports or presentations. This process is time-consuming, error-prone, and often ad hoc, leading to inconsistent coverage of potential insights and limited traceability between the underlying data, the executed queries, and the conclusions presented to stakeholders.

Furthermore, existing tools generally focus on facilitating isolated tasks, such as converting a natural language question into a database query or rendering a single visualization, rather than orchestrating an end-to-end, iterative analytical workflow. They typically do not provide automated generation of multiple candidate business hypotheses from database schemas, systematic validation and refinement of those hypotheses, integrated interpretation of results aligned with business objectives, or structured feedback mechanisms that allow the overall analytical process to improve over time. Accordingly, there remains a need for improved techniques to autonomously generate, validate, interpret, and refine business insights from structured data in a way that reduces manual effort, enhances coverage and consistency of insights, and supports data-driven decision making at scale.

SUMMARY

A summary of several example embodiments of the present disclosure follows. This summary is provided for the convenience of the reader to provide a basic understanding of such embodiments and does not wholly define the breadth of the disclosure. This summary is not an extensive overview of all contemplated embodiments and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

In some examples, a computer-implemented method autonomously generates, validates, and refines business insights from structured data. The method includes receiving schema information describing a plurality of structured data tables stored in one or more databases and automatically generating, based at least in part on the schema information, a plurality of candidate business insight hypotheses without receiving a natural-language query specifying the hypotheses. For individual ones of the candidate business insight hypotheses, corresponding structured queries are generated and executed against the structured data tables to obtain query results indicative of whether the hypotheses are supported or refuted. When an execution failure or inconsistency is detected for at least one structured query, the method automatically refines the structured query or an associated hypothesis and re-executes a refined structured query. Query results for structured queries that successfully execute are aggregated to form validated insight data associated with corresponding validated hypotheses. Textual interpretations describing business implications of the validated hypotheses are generated using a large language model, and visualization code is generated to render one or more visualizations representing at least a portion of the validated hypotheses and the query results. A business insight report is compiled including at least a subset of the validated hypotheses, the textual interpretations, and the one or more visualizations. Individual business insights represented in the business insight report are evaluated according to a plurality of scoring dimensions to obtain respective feedback scores, and subsequent execution of one or more stages of the method is refined based at least in part on the feedback scores so that quality of the business insights improves over multiple iterations.

In certain embodiments, a system comprises one or more processors and one or more non-transitory computer-readable media storing instructions that, when executed, cause the system to perform operations corresponding to the method, including schema analysis, automatic hypothesis generation, structured query generation and execution, query debugging, aggregation of validated insight data, large-language-model-based interpretation, visualization code generation, report compilation, feedback scoring, and iterative refinement of at least some of these operations. In some examples, a shared state repository stores schema information, candidate hypotheses, structured queries, query results, visualization code, feedback scores, and report sections so that context is maintained across multiple iterations. In some embodiments, one or more non-transitory computer-readable storage media store instructions which, when executed by one or more processors, cause performance of any of the methods described herein.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

FIG. 9 is a flow diagram illustrating a method for autonomously generating, validating, and refining business insights using structured databased, according to certain embodiments.

FIG. 19 shows example software code that implements a Transformer block.

DETAILED DESCRIPTION

Figure 1A:
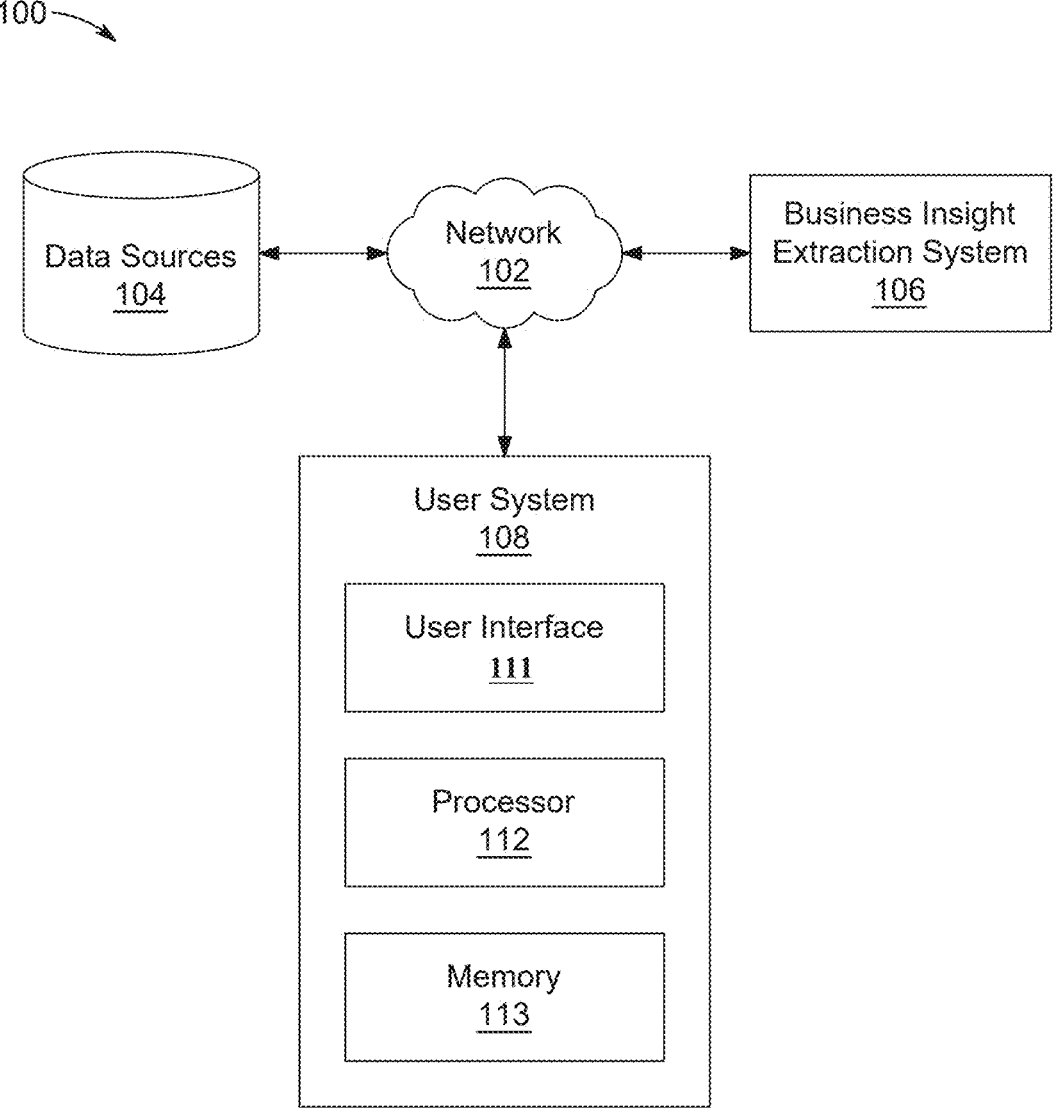
FIG. 1A illustrates an example computing environment in which an autonomous business insight extraction system operates, in accordance with some embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

Modern organizations maintain extensive structured datasets capturing operational, financial, customer, and workforce activity in relational databases, data warehouses, and other structured storage systems. Business intelligence tools and dashboard platforms provide mechanisms to visualize this data, but much of the analytical effort remains manual. Analysts typically inspect database schemas, formulate individual questions, construct and debug structured queries, inspect result sets, and then synthesize narrative reports and charts for decision makers. This manual workflow is time-consuming, requires specialized skills in both data modeling and query languages, and often leads to inconsistent coverage of potential insights and limited traceability from conclusions back to the underlying data.

Existing enhancements, such as natural-language-to-SQL interfaces and large language model (LLM) assistants, primarily operate as front-ends to query execution. They help users translate a specific natural-language question into a structured query or summarize a particular result set, but they remain driven by explicit user prompts. These systems generally do not autonomously explore a space of possible business insights implied by the schema itself, nor do they maintain a persistent analytical context across multiple runs. They also provide limited support for systematically detecting and correcting query failures, for organizing both validated and unvalidated hypotheses into coherent reports, or for learning from feedback to improve the quality of future analyses. As a result, organizations may fail to exploit the full potential of their structured data and may struggle to scale insight generation across departments and use cases.

To address these limitations, some embodiments provide an autonomous analytical workflow that begins with the structure of the available data rather than with ad hoc questions from a user. A data investigation component analyzes the schemas of multiple structured tables, such as employee, project, allocation, financial, or operational tables, to derive meta-descriptions that capture column semantics, data types, key relationships, and representative values. Using these meta-descriptions, a hypothesis generation component formulates a plurality of candidate business insight hypotheses that describe potential patterns, trends, correlations, anomalies, or risk conditions present in the data. These hypotheses are designed to be domain-agnostic, allowing the workflow to adapt across different industries and datasets without bespoke rule sets for each domain.

The candidate hypotheses are then validated through a structured query pipeline. A query execution component transforms each hypothesis into one or more structured queries and executes those queries against the underlying databases or data warehouses. When a query fails due to syntax errors, invalid join conditions, missing filters, data-type mismatches, or runtime performance constraints, a query debugging component detects the failure and generates refined queries or adjusted hypotheses that preserve the intended analytical meaning while correcting the issue. Through this process, the system progressively converts high-level hypotheses into executable, validated analyses, capturing both successful and unsuccessful attempts in a shared state so that the validation history of each hypothesis is preserved.

Validated query results are aggregated and transformed into human-consumable insights by a result aggregation and visualization component. This component normalizes and summarizes the result sets into structured insight representations and invokes an LLM to generate textual interpretations that explain the business implications of each validated hypothesis in the context of organizational goals, key performance indicators, or operational constraints. In parallel, the component selects appropriate visualization types based on the characteristics of the underlying data and produces executable visualization code, such as scripts for charting or user interface libraries, that render charts and other graphical views of the insights. These visualization scripts may be stored and reused to regenerate visualizations for later reporting cycles without re-executing the associated queries, enabling efficient regeneration and customization of reports.

A report generation component compiles these artefacts into a coherent business insight report. In some embodiments, the report includes sections for validated hypotheses with their supporting queries, result summaries, textual interpretations, and visualizations, as well as sections for unvalidated or partially validated hypotheses annotated with failure diagnostics or recommendations for improving data quality or schema design. By organizing both successful and unsuccessful analytical paths, the report offers transparency into what has been explored, what has been confirmed, and what remains uncertain, thereby supporting more informed decision making and better prioritization of data engineering efforts.

To enable systematic improvement, a feedback component evaluates the individual insights included in the report along multiple scoring dimensions, such as relevance to business objectives, actionability, clarity, accuracy, business impact, and consistency with other insights. These scores are used to rank insights, to highlight high-value findings for stakeholders, and to provide structured feedback to the analytical workflow. A refinement component then adjusts the behavior of upstream components—in particular, the hypothesis generation, query execution, query debugging, result aggregation, visualization selection, and report compilation—based at least in part on the feedback scores and historical performance stored in a shared state repository. Over multiple iterations, this feedback loop enables the system to emphasize more impactful hypotheses, avoid unproductive query patterns, improve interpretive narratives, and tailor visualizations to stakeholder preferences.

The described functionality can be deployed in various computing environments. In some embodiments, the components are implemented as software agents executing on one or more servers in communication with on-premises or cloud databases, data warehouses, customer-relationship-management systems, and enterprise-resource-planning systems. A shared state repository, implemented using a database, key-value store, or object storage, maintains schemas, hypotheses, structured queries, query results, visualization scripts, feedback scores, and report fragments across executions. Client devices, such as analyst workstations or executive dashboards, interact with the system through application interfaces to initiate analyses, review reports, and optionally provide additional human feedback. Through this integrated, autonomous, and feedback-driven architecture, the embodiments described herein provide a scalable mechanism to generate, validate, and refine business insights from structured data with reduced manual effort and improved consistency, transparency, and adaptability compared to conventional business intelligence approaches.

FIG. 1A illustrates an autonomous business insight generation system 100. The system 100 is configured to receive structured enterprise data from multiple data sources, transform the data into validated business insights using an automated analytics pipeline, and present the insights to a human user through an interactive interface. As shown, the system 100 includes a communication network 102, one or more data sources 104, a business insight extraction system 106, and a user system 108 having a user interface 111. The business insight extraction system 106 further includes a processor 112 and a memory 113, which together implement the computational logic that drives the autonomous insight generation process.

The communication network 102 provides data connectivity among the data sources 104, the business insight extraction system 106, and the user system 108. The communication network 102 can include one or more wired or wireless networks, such as local area networks, wide area networks, cellular networks, Wi-Fi networks, or public and private Internet Protocol networks. In operation, the communication network 102 carries schema descriptions, query requests, query results, model outputs, insight reports, and user feedback messages. For example, the business insight extraction system 106 can issue structured queries to the data sources 104 over the communication network 102 and receive corresponding result sets, while the user system 108 can send control commands and receive generated reports over the same communication network 102.

The data sources 104 represent one or more repositories of business data that the system 100 analyzes. In various embodiments, the data sources 104 can include structured databases, data warehouses, or object stores that maintain tables describing, for example, employees, projects, resource allocations, financial transactions, customer accounts, or operational events. Each data source 104 may expose a schema that defines table names, column names, data types, and relationships, as well as a query interface that the business insight extraction system 106 can use to retrieve records. The data sources 104 continuously provide updated data over the communication network 102 so that the business insight extraction system 106 can generate business insights based on current information. Conversely, the business insight extraction system 106 can adapt its query patterns and hypothesis generation logic based on observed schemas and statistics derived from the data sources 104.

The business insight extraction system 106 operates as a server-side or cloud-hosted computing platform that orchestrates the autonomous analytics workflow. The business insight extraction system 106 connects to the communication network 102 to access the data sources 104 and the user system 108, and internally it uses the processor 112 and the memory 113 to execute software components. The processor 112 may include one or more central processing units, graphics processing units, tensor processing units, or other processing circuitry capable of executing database clients, machine-learning models, and visualization code. The memory 113 stores program instructions, configuration data, schema meta-descriptions, candidate hypotheses, structured queries, query logs, feedback scores, and generated report content. When the processor 112 executes the instructions stored in the memory 113, the business insight extraction system 106 can perform tasks such as interrogating schemas from the data sources 104, autonomously generating business insight hypotheses, constructing and executing structured queries, detecting and debugging query failures, aggregating and interpreting query results, generating visualizations, and compiling reports. In some embodiments, the business insight extraction system 106 implements these tasks using a collection of cooperating software agents, including data investigation, hypothesis generation, query execution, query debugging, result aggregation, report generation, feedback, and refinement agents, all executing on the processor 112 and operating over the data stored in the memory 113. In some embodiment, generating and executing the structured queries includes automatically constructing structured query language statements for respective candidate business insight hypotheses and executing the structured query language statements against one or more relational databases or data warehouses that store the plurality of structured data tables. In some embodiments, secure communication channels, virtual private networks, or transport-layer security protocols are used within the communication network 102 to protect sensitive business data.

The user system 108 provides an access point through which a human analyst, manager, or other stakeholder interacts with the business insight extraction system 106. The user system 108 can be implemented as a desktop computer, laptop computer, tablet, smartphone, or other network-connected computing device. The user system 108 communicates with the business insight extraction system 106 over the communication network 102 to submit analysis requests, specify configuration options, and retrieve generated insight reports. The user system 108 includes the user interface 111, which presents information to the user and receives user inputs. The user interface 111 can be implemented as a web-based dashboard, a native desktop application, or a mobile application that renders tables, charts, and narrative explanations generated by the business insight extraction system 106. Through the user interface 111, the user can navigate across different insights, drill down into supporting data, and provide explicit feedback or ratings on the usefulness, accuracy, or impact of particular insights. The user system 108 then transmits this feedback back to the business insight extraction system 106, allowing the underlying analytics pipeline to refine future hypotheses and reports.

In operation, the system 100 functions as an end-to-end loop that links the data sources 104, the business insight extraction system 106, and the user system 108 through the communication network 102. The business insight extraction system 106, executing on the processor 112 and using the memory 113, first connects to the data sources 104 to retrieve schema information and data samples. Based on the retrieved schemas, the system 106 autonomously generates candidate business insight hypotheses and formulates structured queries that it sends back to the data sources 104 over the communication network 102. The data sources 104 return query results, which the system 106 aggregates, interprets, and transforms into visual and textual insight elements stored in the memory 113. The system 106 compiles these elements into a business insight report and transmits the report to the user system 108. The user interface 111 renders the report, and the user can respond by providing feedback, which the user system 108 returns to the business insight extraction system 106. The system 106 incorporates this feedback into its models and heuristics, so that subsequent executions over the data sources 104 yield progressively more relevant and actionable insights. In this way, all components shown in FIG. 1A implemented within the system 100 to convert raw structured data into continuously refined business intelligence delivered to the user.

Figure 1B:
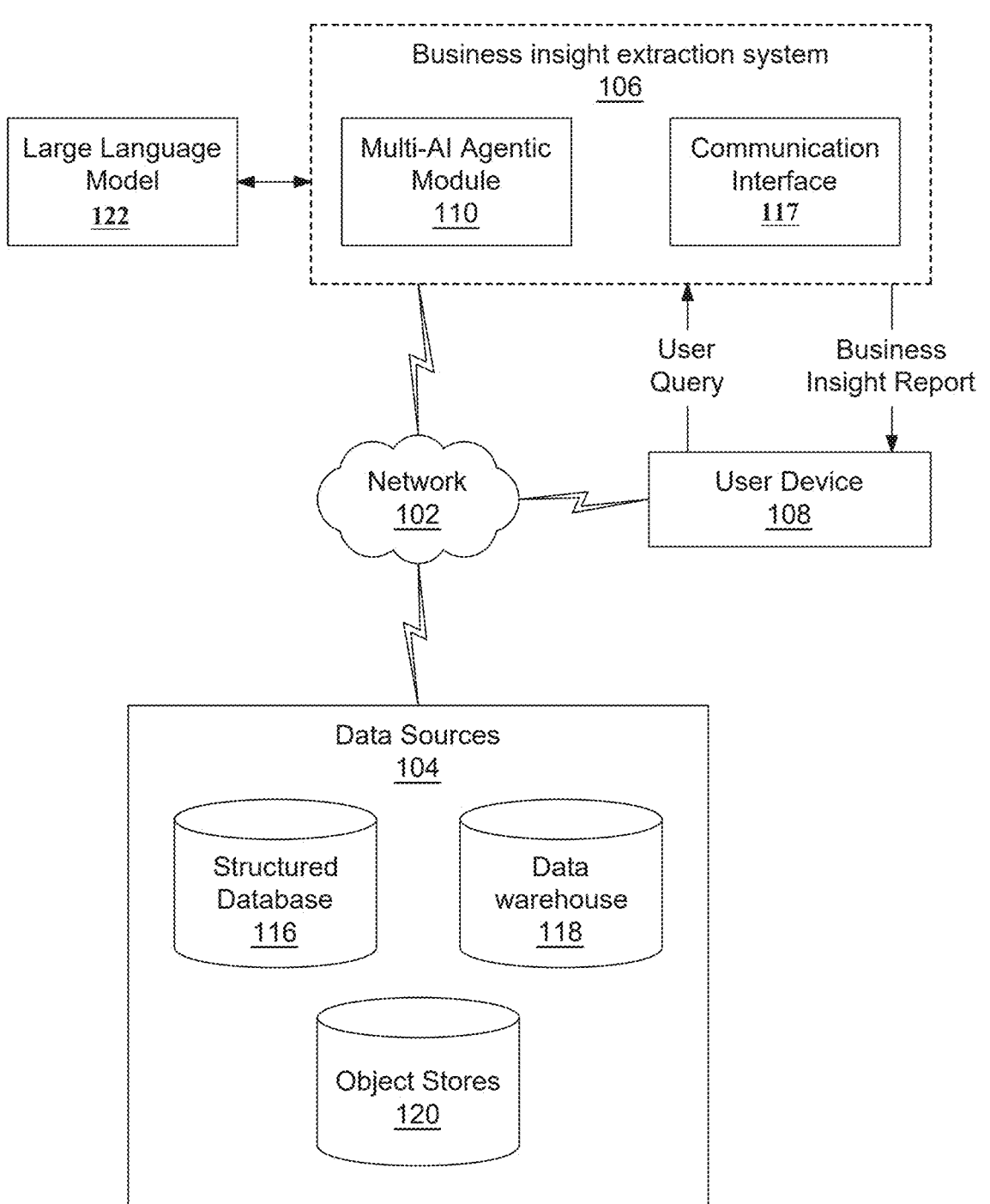
FIG. 1B illustrates a business insight extraction system 106 in accordance with an embodiment of the present invention, in accordance with some embodiments.

FIG. 1B illustrates a business insight extraction system 106 in accordance with an embodiment of the present invention. The business insight extraction system 106 is configured to autonomously generate, validate, and refine business insights from structured data sources through a multi-agent artificial intelligence architecture. The system 106 comprises a Multi-AI Agentic Module 110, a Large Language Model 122, and a Communication interface 117, all operatively interconnected to facilitate end-to-end autonomous business intelligence operations.

System Architecture and Component Integration

The business insight extraction system 106 operates as a distributed computing architecture that processes user queries and generates comprehensive business insight reports without requiring manual intervention in hypothesis formulation, SQL query generation, or data interpretation. The system 106 is communicatively coupled to a network 102, which may be implemented as a local area network (LAN), wide area network (WAN), the Internet, a cloud computing infrastructure, or any combination thereof. In various embodiments, the network 102 may comprise wired connections (e.g., Ethernet, fiber optic), wireless connections (e.g., Wi-Fi, cellular networks such as 4G, 5G, or subsequent generations), or hybrid network topologies that provide secure, high-bandwidth communication channels between system components.

Multi-AI Agentic Module 110

The Multi-AI Agentic Module 110 comprises the core intelligence layer of the system 106 and implements a plurality of specialized artificial intelligence agents that operate in a coordinated, state-driven workflow. Each agent within the Multi-AI Agentic Module 110 is configured to perform specific tasks in the business insight generation pipeline, including but not limited to data investigation, hypothesis generation, hypothesis validation, query debugging, result aggregation, visualization generation, report compilation, feedback evaluation, and iterative refinement.

In a preferred embodiment, the Multi-AI Agentic Module 110 comprises a plurality of agents.

Data Investigation Agent

The Data Investigation Agent is configured to autonomously analyze the structure, schema, and metadata of structured data tables stored in the Data Sources 104. The agent inspects column names, data types, primary and foreign key relationships, cardinality constraints, and unique value distributions to generate comprehensive meta-descriptions of the database schema. The Data Investigation Agent employs schema introspection techniques, statistical sampling methods, and pattern recognition algorithms to understand the semantic relationships between tables and identify potential areas for business insight generation. In various embodiments, the Data Investigation Agent may utilize SQL DESCRIBE statements, INFORMATION_SCHEMA queries, or database-specific catalog views to extract schema information. The agent stores the analyzed schema information in a structured format (e.g., JSON, XML, or proprietary data structures) for consumption by downstream agents.

Hypothesis Generation Agent:

The Hypothesis Generation Agent receives the schema information from the Data Investigation Agent and autonomously formulates business-relevant hypotheses based on the available data structures. The agent employs predefined hypothesis templates, domain-specific knowledge bases, and machine learning-based pattern recognition to generate hypotheses such as employee utilization rates, project cost analyses, resource allocation efficiency, skills gap identification, budget variance analysis, and temporal trend predictions. In one embodiment, the Hypothesis Generation Agent maintains a library of hypothesis templates that are parameterized based on the specific schema characteristics identified in the data investigation phase. For example, upon detecting tables with temporal columns (e.g., start_date, end_date), the agent may generate time-series hypotheses examining trends, seasonality, or anomalies over time. The generated hypotheses are ranked by potential business impact and feasibility of validation through SQL query execution.

Hypothesis Validation Agent:

The Hypothesis Validation Agent translates the business hypotheses into executable SQL queries and executes them against the structured databases in the Data Sources 104. The agent employs query generation algorithms that map natural language hypothesis statements to SQL syntax, ensuring proper JOIN operations, WHERE clauses, GROUP BY aggregations, and HAVING filters are correctly formulated. In various embodiments, the Hypothesis Validation Agent may generate queries ranging from simple SELECT statements to complex multi-table joins with subqueries, common table expressions (CTEs), window functions, and advanced analytical functions. The agent executes the generated queries through database connection interfaces (e.g., JDBC, ODBC, native database drivers) and retrieves result sets for subsequent interpretation. The Hypothesis Validation Agent maintains a validation state for each hypothesis, marking them as "validated," "failed," or "pending refinement" based on query execution success and result quality.

Query Debugging Agent:

The Query Debugging Agent is invoked when SQL query execution fails due to syntax errors, semantic errors, missing table references, invalid column names, type mismatches, or other database-related exceptions. The agent analyzes error messages returned by the database management system, identifies the root cause of failures, and autonomously refines the SQL queries or adjusts the underlying hypotheses to ensure successful execution. In one embodiment, the Query Debugging Agent employs a rule-based expert system that maps common SQL error patterns to corrective actions. For example, if a query fails due to an ambiguous column reference in a multi-table join, the agent automatically qualifies the column name with the appropriate table alias. In another embodiment, the Query Debugging Agent may utilize machine learning models trained on historical query failures and successful corrections to predict optimal query refinements. The agent implements iterative debugging cycles, with each cycle attempting a refined query until successful execution is achieved or a maximum iteration threshold is reached.

Result Aggregation and Visualization Agent:

The Result Aggregation and Visualization Agent processes the validated SQL query results and generates both textual interpretations and graphical visualizations that illustrate the business insights. The agent analyzes the structure and statistical properties of the result sets to determine the most appropriate visualization types. For categorical distributions, the agent may generate bar charts or pie charts; for temporal trends, line graphs or area charts; for correlations, scatter plots or heat maps; and for hierarchical relationships, tree diagrams or sunburst charts. In a preferred embodiment, the agent generates visualization scripts using Python libraries such as matplotlib, Plotly, or Seaborn, which are stored as reusable code artifacts. Alternatively, the agent may generate interactive web-based visualizations using ReactJS components with charting libraries such as Chart.js, D3.js, or Recharts. The generated visualization scripts include parameterization capabilities, allowing human experts to adjust visual properties (e.g., colors, labels, scales, legends) without modifying the core script logic. The agent stores both the raw visualization scripts and rendered output files (e.g., PNG, SVG, HTML) in a visualization repository for inclusion in the final business insight reports.

Report Generation Agent:

The Report Generation Agent compiles the validated hypotheses, SQL queries, interpretations, visualizations, and metadata into a comprehensive, structured business insight report. The agent implements a template-based report generation system that allows customization of report sections, including executive summaries, table of contents, detailed insight descriptions, supporting data tables, visualizations, SQL query appendices, and recommendations for future analysis. In one embodiment, the Report Generation Agent generates reports in multiple formats, including HTML for web viewing, PDF for distribution and archival, Microsoft Word (DOCX) for editing, and JSON or XML for programmatic consumption by downstream business intelligence systems. The agent incorporates dynamic content insertion, conditional section inclusion based on insight relevance scores, and automatic cross-referencing between related insights within the report. The Report Generation Agent also includes metadata such as report generation timestamps, data source versions, query execution statistics, and system confidence scores to provide transparency and auditability.

Feedback Agent:

The Feedback Agent evaluates each generated business insight across multiple quality dimensions, including relevance to business objectives, actionability of recommendations, clarity of presentation, accuracy of data interpretation, potential business impact, and consistency with other insights in the report. The agent assigns numerical scores (e.g., on a scale of 0-100 or normalized 0-1 values) for each dimension and computes composite scores using weighted averaging or other aggregation functions. In various embodiments, the Feedback Agent may implement rule-based scoring systems, machine learning-based quality assessment models, or hybrid approaches combining multiple evaluation methodologies. The agent identifies insights that fall below quality thresholds and flags them for refinement or exclusion from the final report. The feedback scores and qualitative assessments are stored in a feedback repository and made available to the Refinement Agent for continuous improvement of the system's output quality.

Refinement Agent:

The Refinement Agent renders the iterative improvement process by incorporating feedback from the Feedback Agent and adjusting the hypotheses, SQL queries, interpretations, visualizations, and report structure in subsequent execution cycles. In one embodiment, refining the at least one structured query or the corresponding candidate business insight hypothesis comprises generating a revised structured query that corrects a detected error while maintaining an intended analytical meaning of the corresponding candidate business insight hypothesis.

The agent maintains a refinement history that tracks changes across iterations, enabling analysis of improvement trajectories and identification of persistent quality issues. In one embodiment, the Refinement Agent implements a reinforcement learning framework where successful refinements (those that lead to higher feedback scores) are rewarded and reinforced in future iterations, while unsuccessful refinements are penalized. The agent may adjust hypothesis specificity, modify SQL query complexity, refine interpretation language for clarity, or select alternative visualization types based on feedback patterns. The Refinement Agent ensures that the system evolves toward generating increasingly accurate, relevant, and actionable business insights aligned with organizational strategic objectives.

Large Language Model 122

The Large Language Model 122 provides natural language understanding and generation capabilities that enable the Multi-AI Agentic Module 110 to interpret SQL query results in the context of business strategy, executive decision-making, and organizational objectives. The Large Language Model 122 may be implemented using transformer-based neural network architectures such as GPT (Generative Pre-trained Transformer), BERT (Bidirectional Encoder Representations from Transformers), T5 (Text-to-Text Transfer Transformer), or proprietary large language models developed specifically for business intelligence applications.

In various embodiments, the Large Language Model 122 is configured to receive structured data inputs (e.g., SQL query results in tabular format) along with contextual information (e.g., business domain, organizational goals, industry benchmarks) and generate human-readable interpretations that explain the significance of the data patterns, identify actionable recommendations, highlight risks and opportunities, and align the insights with C-level strategic concerns such as revenue growth, cost optimization, operational efficiency, competitive positioning, and risk management.

The Large Language Model 122 may be deployed in several architectural configurations: (1) as a cloud-hosted API service (e.g., OpenAI API, Anthropic Claude API, Google Vertex AI) accessed via secure network connections; (2) as an on-premises model deployed on dedicated GPU/TPU infrastructure within the organization's data center; (3) as a fine-tuned model trained on organization-specific business documents, historical reports, and domain knowledge to enhance contextual relevance; or (4) as an ensemble of multiple language models that provide diverse perspectives on data interpretation, which are subsequently aggregated or synthesized by the Multi-AI Agentic Module 110.

The Large Language Model 122 interfaces with the Multi-AI Agentic Module 110 through standardized API protocols (e.g., REST APIs, gRPC) that transmit prompts containing data and context and receive structured or unstructured text responses. In a preferred embodiment, the Large Language Model 122 is prompted using carefully engineered prompt templates that specify the desired output format, level of detail, target audience (e.g., executives, analysts, operational managers), and specific analysis frameworks to apply (e.g., SWOT analysis, root cause analysis, cost-benefit analysis).

Communication Interface 117

The Communication interface 117 manages all external communications between the business insight extraction system 106 and external entities, including User Devices 108, external databases, and third-party business intelligence platforms. The Communication interface 117 implements secure communication protocols such as HTTPS, TLS/SSL encryption, OAuth 2.0 authentication, API key validation, and role-based access control (RBAC) to ensure that only authorized users and systems can interact with the business insight extraction system 106.

In various embodiments, the Communication interface 117 provides multiple communication channels: (1) a RESTful API endpoint that accepts HTTP requests containing user queries in structured formats (e.g., JSON, XML) and returns business insight reports in the requested format; (2) a WebSocket interface for real-time, bidirectional communication supporting streaming responses for long-running insight generation tasks; (3) a message queue interface (e.g., using RabbitMQ, Apache Kafka, AWS SQS) for asynchronous task submission and result retrieval in high-volume enterprise environments; and (4) a web-based user interface served through HTTP/HTTPS protocols, providing interactive query submission, report viewing, and system configuration capabilities.

The Communication interface 117 also implements request validation, rate limiting, request logging, and error handling mechanisms to ensure system stability and security. In one embodiment, the interface applies input sanitization and validation rules to prevent SQL injection attacks, cross-site scripting (XSS) vulnerabilities, and other security threats that could compromise the system or the underlying data sources.

User Device

The User Device 108 represents any computing device operated by a human user to interact with the business insight extraction system 106. The User Device 108 may be implemented as a desktop computer, laptop computer, tablet device, smartphone, smart watch, or any other computing device capable of network communication and user interaction. The User Device 108 comprises at least a processor, memory, input devices (e.g., keyboard, mouse, touchscreen), output devices (e.g., display screen, speakers), and network communication interfaces (e.g., Wi-Fi adapter, cellular modem, Ethernet port).

Users interact with the business insight extraction system 106 through the User Device 108 by submitting User Queries that specify the business questions or areas of investigation they wish to explore. User Queries may be formulated in natural language (e.g., "What is the employee utilization rate by department?", "Which projects are over budget?"), structured query formats (e.g., JSON objects specifying parameters, filters, and desired output formats), or through interactive graphical user interfaces that guide users through query construction using forms, dropdown menus, and selection widgets.

The User Device 108 receives Business Insight Reports generated by the system 106, which may be displayed in the user's web browser, rendered in a dedicated mobile application, downloaded as files (e.g., PDF, DOCX, HTML), or integrated into the user's existing business intelligence dashboards. In various embodiments, the Business Insight Reports are interactive documents that allow users to drill down into specific insights, view underlying data, modify visualizations, export data subsets, or trigger follow-up queries based on the insights presented.

Network 102

The network 102 provides the communication infrastructure that interconnects the User Device 108, the business insight extraction system 106, and the Data Sources 104. The network 102 may comprise multiple network segments, including internal corporate networks (intranets), virtual private networks (VPNs), public internet connections, dedicated leased lines, and cloud provider networks. Network communications are secured using industry-standard encryption protocols (e.g., TLS 1.3), and network traffic may be monitored and filtered using firewalls, intrusion detection systems (IDS), and intrusion prevention systems (IPS) to protect against unauthorized access and cyber threats.

In one embodiment, the network 102 implements quality of service (QoS) mechanisms to prioritize critical business insight generation tasks, ensuring that time-sensitive queries receive adequate network bandwidth and low-latency connections to data sources. The network 102 may also implement load balancing across multiple instances of the business insight extraction system 106 to distribute query processing workload and ensure high availability and fault tolerance.

Data Sources 104

The Data Sources 104 comprise one or more data storage systems that contain the structured data upon which the business insight extraction system 106 operates. The Data Sources 104 include, but are not limited to, a Structured Database 116, a Data warehouse 118, and Object Stores 120. Each data source type serves specific data storage and retrieval requirements within the overall data architecture.

Structured Database 116:

The Structured Database 116 is a relational database management system (RDBMS) that stores structured data in tables with predefined schemas comprising rows and columns. The Structured Database 116 may be implemented using database systems such as PostgreSQL, MySQL, Oracle Database, Microsoft SQL Server, IBM Db2, or other SQL-compliant database platforms. The database stores operational data related to business entities such as employees, projects, allocations, customers, products, transactions, and organizational hierarchies. Data in the Structured Database 116 is organized according to normalization principles (e.g., third normal form) to minimize redundancy and maintain referential integrity through primary key and foreign key constraints.

In various embodiments, the Structured Database 116 comprises multiple related tables such as an Employee table containing employee demographic information (e.g., employee_id, name, department, hire_date, salary), a Project table containing project metadata (e.g., project_id, project_name, start_date, end_date, budget, status), and an Allocation table representing the assignment of employees to projects (e.g., allocation_id, employee_id, project_id, allocation_percentage, role). The Multi-AI Agentic Module 110 executes SQL queries against these tables to validate business hypotheses, joining tables as necessary to compute metrics such as employee utilization rates, project cost overruns, resource allocation efficiency, and skill distribution across projects.

Data Warehouse 118:

The Data warehouse 118 is an analytical database optimized for complex queries, aggregations, and reporting operations on large volumes of historical data. The Data warehouse 118 may be implemented using columnar database technologies such as Amazon Redshift, Google Big- Query, Snowflake, Microsoft Azure Synapse Analytics, or Apache Hive. Unlike operational databases that are optimized for transactional processing (OLTP), the Data warehouse 118 is structured for online analytical processing (OLAP) using dimensional modeling techniques such as star schemas or snowflake schemas.

The Data warehouse 118 typically contains fact tables (e.g., sales transactions, financial records, event logs) and dimension tables (e.g., time dimensions, geographic dimensions, product hierarchies) that enable efficient aggregation and slicing/dicing of data across multiple analytical dimensions. The Multi-AI Agentic Module 110 may execute complex analytical queries against the Data warehouse 118 to compute trend analyses, comparative statistics across time periods, segmentation analyses, and multi-dimensional aggregations that inform strategic business insights. The Data warehouse 118 may employ indexing strategies, materialized views, partitioning schemes, and query optimization techniques to deliver fast query response times even on datasets comprising billions of records.

Object Stores 120:

The Object Stores 120 provide scalable, distributed storage for unstructured or semi-structured data objects such as documents, images, videos, log files, JSON files, CSV files, Parquet files, and other data formats that do not fit neatly into relational table structures. The Object Stores 120 may be implemented using cloud storage services such as Amazon S3, Google Cloud Storage, Microsoft Azure Blob Storage, or on-premises object storage systems such as MinIO, Ceph, or OpenStack Swift.

In various embodiments, the Object Stores 120 contain supplementary data that enriches the structured data analysis, such as project documentation files, employee performance review documents, customer feedback data, email archives, or external market research reports. The Multi-AI Agentic Module 110 may access data from Object Stores 120 to incorporate unstructured data insights into the business intelligence process, using natural language processing, document parsing, or data extraction techniques to transform unstructured content into analyzable formats. For example, the system may extract project status information from PDF reports stored in Object Stores 120 and correlate this information with structured project data from the Structured Database 116 to generate more comprehensive project performance insights.

Data Flow and System Operation

The operational workflow of the business insight extraction system 106 proceeds as follows: A user submits a User Query through the User Device 108, which is transmitted across the network 102 to the Communication interface 117 of the business insight extraction system 106. The Communication interface 117 receives, authenticates, and validates the User Query, then forwards it to the Multi-AI Agentic Module 110 for processing.

The Multi-AI Agentic Module 110 initiates the insight generation workflow by activating the Data Investigation Agent, which connects to the Data Sources 104 (including Structured Database 116, Data warehouse 118, and Object Stores 120) through the network 102 to analyze the available data schemas and structures. The Data Investigation Agent returns schema metadata to the Multi-AI Agentic Module 110, which is then processed by the Hypothesis Generation Agent to formulate business-relevant hypotheses aligned with the User Query.

The generated hypotheses are passed to the Hypothesis Validation Agent, which translates them into executable SQL queries. These queries are transmitted through the network 102 to the appropriate data sources (primarily Structured Database 116 and Data warehouse 118) for execution. Query results are returned to the Multi-AI Agentic Module 110. If query execution fails, the Query Debugging Agent analyzes the failure, refines the query or hypothesis, and resubmits for execution.

Successfully validated queries and their results are processed by the Result Aggregation and Visualization Agent, which generates textual interpretations and graphical visualizations. The Large Language Model 122 is invoked to provide natural language interpretations of the data patterns, contextualizing the findings within business strategy and executive decision-making frameworks.

The Report Generation Agent compiles all validated insights, queries, visualizations, and interpretations into a comprehensive Business Insight Report. The Feedback Agent evaluates the quality of each insight component, and the Refinement Agent applies any necessary adjustments based on feedback scores. The finalized Business Insight Report is transmitted through the Communication interface 117 across the network 102 to the User Device 108, where it is presented to the user for review and decision-making.

Alternative Embodiments and Variations

In an alternative embodiment, the Multi-AI Agentic Module 110 may be implemented as a distributed system with agents deployed across multiple compute nodes or cloud instances, coordinated through a centralized orchestration service using technologies such as Apache Airflow, Kubernetes, or serverless function platforms (e.g., AWS Lambda, Google Cloud Functions).

In another embodiment, the Large Language Model 122 may be replaced or supplemented with domain-specific expert systems, rule-based reasoning engines, or symbolic AI systems that provide deterministic, explainable interpretations of business data based on formal business logic rules and domain ontologies.

In yet another embodiment, the system 106 may incorporate real-time data streaming capabilities, where the Data Sources 104 include stream processing systems (e.g., Apache Kafka, Apache Flink, AWS Kinesis) that provide continuous data feeds for real-time business insight generation and alerting based on predefined threshold conditions or anomaly detection algorithms.

In a further embodiment, the system 106 may implement advanced privacy-preserving techniques such as differential privacy, federated learning, or homomorphic encryption to enable business insight generation on sensitive data while maintaining compliance with data protection regulations such as GDPR, CCPA, or HIPAA.

The business insight extraction system 106 may be deployed in various architectural configurations including on-premises installations within enterprise data centers, cloud-hosted deployments on platforms such as AWS, Google Cloud, or Microsoft Azure, hybrid cloud architectures combining on-premises and cloud resources, or as a software-as-a-service (SaaS) offering accessible to multiple organizational customers through multi-tenant infrastructure with appropriate data isolation and security controls.

System Integration and Architecture

Figure 2A:
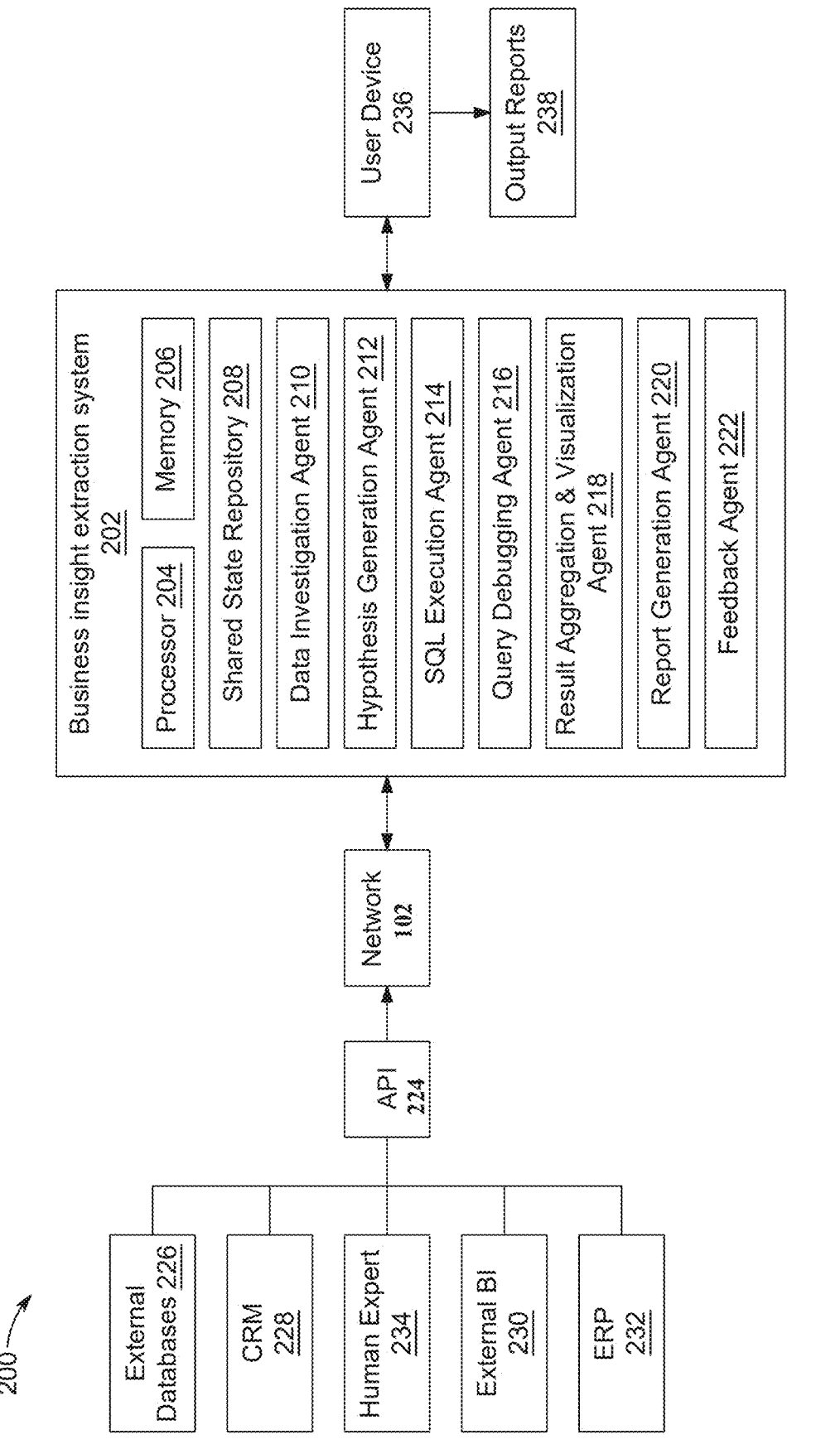
FIG. 2A illustrates a business insight extraction system architecture employing multiple artificial intelligence agents for autonomously generating and delivering business insights from structured data sources, in accordance with some embodiments.

FIG. 2A illustrates a business insight extraction system 202 configured to autonomously generate, validate, and refine business insights from structured data sources through a multi-agent artificial intelligence architecture in accordance with an embodiment of the present invention. The business insight extraction system 202 comprises a plurality of specialized artificial intelligence agents including a Data Investigation Agent 210, a Hypothesis Generation Agent 212, a SQL Execution Agent 214, a Query Debugging Agent 216, a Result Aggregation and Visualization Agent 218, a Report Generation Agent 220, and a Feedback Agent 222. The system 202 further comprises a processor 204, a memory 206, and a Shared State Repository 208 that maintains state persistence throughout the multi-agent workflow. The system 202 is communicatively coupled through an Application Programming Interface (API) 224 and a network 102 to external entities including External Databases 226, Customer Relationship Management (CRM) systems 228, External Business Intelligence (BI) tools 230, Enterprise Resource Planning (ERP) systems 232, human experts 234, and user devices 236. The system 202 generates output reports 238 that are transmitted to the user devices 236 for consumption by business stakeholders.

The business insight extraction system 202 implements a distributed multi-agent architecture wherein each agent is responsible for a specific phase of the business insight generation workflow. The agents operate in a coordinated, state-driven manner, with each agent output being stored in the Shared State Repository 208 for access by subsequent agents in the processing pipeline. This state-persistence mechanism ensures that hypotheses, SQL queries, query results, validation states, visualizations, interpretations, and feedback scores are maintained throughout the workflow, enabling seamless transitions between processing stages without loss of context or intermediate results.

The system 202 is implemented on computing infrastructure comprising at least one processor 204, which may be implemented as separate physical processors, separate processing cores within a multi-core processor, separate virtual machines or containers in a cloud-computing environment, or distributed processing nodes in a cluster-computing architecture. In various embodiments, one or more processors 204 may execute the agents concurrently, in parallel, or according to a sequential execution schedule orchestrated by a workflow management system. The use of multiple processing cores or instances of the processor 204 enables the system 202 to handle large-scale data-processing tasks, execute multiple agent operations simultaneously, and scale to meet the computational demands of enterprise-level business intelligence operations.

The processor 204 comprises one or more central processing units (CPUs), graphics processing units (GPUs), tensor processing units (TPUs), application-specific integrated circuits (ASICs), or other computational hardware configured to execute software instructions implementing the agent logic. In a preferred embodiment, the processor 204 is responsible for executing the data investigation, hypothesis generation, and SQL execution phases of the workflow. The processor 204 may be implemented as a multi-core processor with each core dedicated to executing specific agent operations, or as a single high-performance processor capable of context-switching between multiple agent execution threads. In cloud-based deployments, the processor 204 may represent a virtual CPU allocation provided by cloud-computing platforms such as Amazon Web Services (AWS) EC2 instances, Google Cloud Compute Engine instances, or Microsoft Azure Virtual Machines. The processor 204 accesses the Shared State Repository 208 to retrieve schema information, store generated hypotheses, and record SQL query execution results.

The processor 204 is operatively coupled to the memory 206 within the business insight extraction system 202. The memory 206 comprises one or more non-transitory computer-readable storage media configured to store program instructions and data used during autonomous generation, validation, and refinement of business insights. The memory 206 may include a combination of volatile storage, such as random-access memory, and non-volatile storage, such as flash memory or solid-state drives, sized to support execution of the multi-agent workflow described herein.

The memory 206 stores executable instructions that, when executed by the processor 204, implement functionalities of the Data Investigation Agent 210, the Hypothesis Generation Agent 212, the SQL Execution Agent 214, the Query Debugging Agent 216, the Result Aggregation and Visualization Agent 218, the Report Generation Agent 220, the Feedback Agent 222, and a refinement agent. The memory 206 further stores schema information describing structured data tables obtained from the data sources 104, candidate business insight hypotheses generated from the schema information, structured queries corresponding to the candidate business insight hypotheses, and query results produced by executing the structured queries.

The memory 206 additionally stores validated insight data derived from the query results, textual interpretations generated using a large language model, visualization code or scripts configured to render visualizations of the validated insight data, compiled business insight reports, and feedback scores assigned to individual business insights. By maintaining these instructions and data artifacts, the memory 206 enables the processor 204 to execute the autonomous pipeline in an iterative manner and to refine subsequent executions based at least in part on previously stored states and feedback.

The Shared State Repository 208 comprises a data storage system that maintains persistent state information throughout the multi-agent workflow, ensuring that data generated by one agent is accessible to all subsequent agents in the processing pipeline. The Shared State Repository 208 stores structured data objects including database schema metadata, generated business insight hypotheses, SQL query statements, query execution results, validation states (validated, failed, pending refinement), error messages from failed query executions, generated visualization scripts, rendered visualization files, textual interpretations of insights, feedback scores across multiple dimensions (relevance, actionability, clarity, accuracy, business impact), and refinement history tracking changes across multiple iterations.

In various embodiments, the Shared State Repository 208 may be implemented as: (1) an in-memory data structure such as a hash map, dictionary, or object cache maintained in the system RAM for high-speed access during workflow execution; (2) a relational database management system (e.g., PostgreSQL, MySQL) with tables designed to store workflow state information with appropriate indexing for fast retrieval; (3) a NoSQL database (e.g., MongoDB, Redis, Cassandra) optimized for storing semi-structured state objects with flexible schemas; (4) a distributed data store (e.g., Apache Ignite, Hazelcast) that provides shared state access across multiple processor nodes in a distributed-computing environment; or (5) a persistent storage system with both in-memory caching and disk-based persistence to balance performance and durability requirements.

The Shared State Repository 208 implements concurrency-control mechanisms such as optimistic locking, pessimistic locking, or multi-version concurrency control (MVCC) to ensure data consistency when multiple agents or processors attempt to read or modify shared state simultaneously. The repository maintains versioning of state objects to enable rollback to previous states if errors occur during processing and implements transaction semantics to ensure atomic updates when multiple related state changes must be applied together. In one embodiment, the Shared State Repository 208 maintains a workflow execution log that records all state transitions, agent invocations, and data transformations, providing complete auditability and enabling debugging of workflow execution issues.

The Data Investigation Agent 210 constitutes the initial agent in the workflow pipeline and is configured to autonomously analyze the structure, schema, and metadata of structured data tables provided as input to the system 202. The Data Investigation Agent 210 connects to the External Databases 226 through the network 102 and the API 224 to retrieve schema information including table names, column names, data types (e.g., INTEGER, VARCHAR, DATE, DECIMAL, BOOLEAN), primary key constraints, foreign key relationships defining referential integrity between tables, unique constraints, check constraints, default values, and nullable/non-nullable specifications.

The Data Investigation Agent 210 employs database introspection techniques appropriate to the specific database management system being analyzed. For SQL-based databases, the Data Investigation Agent 210 may execute INFORMATION_SCHEMA queries, system catalog queries (e.g., querying pg_catalog in PostgreSQL, sys.tables and sys.columns in Microsoft SQL Server), or DESCRIBE/SHOW statements to extract schema metadata. The Data Investigation Agent 210 analyzes data distributions by executing statistical queries such as COUNT DISTINCT to identify cardinality of categorical columns, MIN/MAX queries to determine value ranges for numerical and date columns, and sampling queries to retrieve representative data values for inspection.

In addition to structural analysis, the Data Investigation Agent 210 performs semantic analysis to infer the business meaning of database columns based on column names, data types, and sample values. For example, columns named "employee_id", "emp_id", or "worker_id" are recognized as employee identifiers; columns with DATE or TIMESTAMP data types are identified as temporal fields enabling time-series analysis; columns with DECIMAL or NUMERIC types and names containing "salary", "cost", "revenue", or "price" are identified as financial metrics; and columns with constrained value sets are identified as categorical dimensions suitable for grouping and segmentation analysis.

The Data Investigation Agent 210 generates comprehensive meta-descriptions of each analyzed table, including human-readable summaries of table purposes (e.g., "Employee table stores demographic and organizational information about company personnel"), relationships between tables (e.g., "Allocation table links employees to projects via foreign keys"), and potential analytical dimensions (e.g., "department, location, job_title provide grouping dimensions for employee analysis"). These meta-descriptions are stored in the Shared State Repository 208 in structured formats such as JSON or XML, making them accessible to the Hypothesis Generation Agent 212 for formulating business-relevant hypotheses. The Data Investigation Agent 210 may also identify data quality issues such as missing values, inconsistent formats, outliers, or referential integrity violations, which are reported as metadata to inform subsequent hypothesis generation and query formulation.

The Hypothesis Generation Agent 212 receives schema metadata and data descriptions from the Data Investigation Agent 210 via the Shared State Repository 208 and autonomously formulates a plurality of candidate business insight hypotheses that can be validated through SQL query execution against the structured data tables. The Hypothesis Generation Agent 212 implements multiple hypothesis generation methodologies including template-based generation, rule-based generation, and machine-learning-based generation.

In template-based generation, the Hypothesis Generation Agent 212 maintains a library of parameterized hypothesis templates that are instantiated based on the specific schema characteristics identified during data investigation. The hypothesis templates describe potential metrics, correlations, trends, anomalies, or risk conditions across the plurality of structured data tables, including at least one of utilization analysis, cost analysis, skills-gap analysis, risk analysis, or opportunity analysis. For example, upon detecting an Employee table with a department column and a salary column, the Hypothesis Generation Agent 212 may instantiate a template hypothesis: "Analyze average salary by department to identify compensation disparities." Upon detecting temporal columns (start_date, end_date) in a Project table, the Hypothesis Generation Agent 212 may generate hypotheses related to project duration trends, seasonal patterns, or year-over-year comparisons. Upon detecting allocation relationships between employees and projects, the Hypothesis Generation Agent 212 may generate hypotheses related to resource utilization rates, allocation efficiency, or workload distribution.

The Hypothesis Generation Agent 212 generates hypotheses across multiple business intelligence domains including: (1) descriptive analytics hypotheses that characterize current state (e.g., "What is the current distribution of employees across departments?", "What is the average project cost by project type?"); (2) diagnostic analytics hypotheses that explain why certain patterns exist (e.g., "Why are certain departments experiencing higher turnover rates?", "What factors correlate with project cost overruns?"); (3) predictive analytics hypotheses that forecast future trends (e.g., "Which projects are at risk of exceeding budget based on current burn rates?", "What is the projected resource demand for next quarter?"); and (4) prescriptive analytics hypotheses that recommend actions (e.g., "How should resources be reallocated to optimize utilization?", "Which employees should be assigned to which projects to maximize skill match?").

In one embodiment, the Hypothesis Generation Agent 212 employs a large language model to generate hypotheses by providing the schema metadata and example business questions as prompts to the language model, which generates natural-language hypothesis statements that are subsequently parsed and structured for downstream processing. The Hypothesis Generation Agent 212 may generate between 5 and 50 candidate hypotheses depending on the complexity of the schema and the breadth of analytical coverage desired. Each generated hypothesis is tagged with metadata indicating its priority, expected business impact, required data sources, estimated query complexity, and prerequisite hypotheses that must be validated before the current hypothesis can be meaningfully evaluated.

The generated hypotheses are ranked according to multiple criteria including business relevance (alignment with common business KPIs and strategic objectives), data availability (whether required data exists in the analyzed schemas), validation feasibility (whether the hypothesis can be validated through executable SQL queries), and analytical novelty (whether the hypothesis provides insights not readily apparent from simple data inspection). The ranked hypotheses are stored in the Shared State Repository 208 with associated metadata, making them available for validation by the SQL Execution Agent 214. In various embodiments, the Hypothesis Generation Agent 212 may interact with the human experts 234 to solicit input on hypothesis priorities, incorporate domain-specific business knowledge, or clarify ambiguous business requirements.

The SQL Execution Agent 214 is configured to translate business insight hypotheses into executable structured query language (SQL) statements and execute these queries against the External Databases 226 to validate the hypotheses and retrieve data supporting or refuting the hypothesized insights. The SQL Execution Agent 214 retrieves candidate hypotheses from the Shared State Repository 208, analyzes the hypothesis statements to identify required data elements, tables, relationships, filters, groupings, and aggregations, and synthesizes syntactically correct SQL queries that will produce the desired analytical results.

The SQL Execution Agent 214 employs natural-language-to-SQL translation techniques, which may include: (1) rule-based semantic parsing that maps hypothesis components to SQL clauses (e.g., "by department" maps to GROUP BY department); (2) template-based query generation where hypothesis patterns are matched to pre-defined SQL query templates with parameterizable components; (3) machine-learning-based sequence-to-sequence models that generate SQL code from natural-language descriptions; or (4) hybrid approaches combining multiple translation techniques with validation and refinement logic.

For a hypothesis such as "Analyze average employee utilization rate by department for Q3 2024," the SQL Execution Agent 214 generates a query that: (1) identifies the relevant tables (Employee table for department information, Allocation table for utilization data); (2) constructs appropriate JOIN clauses to combine these tables based on foreign key relationships; (3) applies WHERE-clause filters to restrict data to the Q3 2024 time period; (4) implements a GROUP BY clause to aggregate by department; (5) calculates the utilization-rate metric using appropriate aggregate functions and arithmetic expressions; and (6) orders or formats results appropriately for human interpretation.

The generated SQL queries may range in complexity from simple single-table SELECT statements to complex multi-table joins involving subqueries, common table expressions, window functions, CASE expressions, set operations, and recursive expressions. The SQL Execution Agent 214 is designed to be database-agnostic and is capable of generating SQL compatible with various database management systems including PostgreSQL, MySQL, Oracle Database, Microsoft SQL Server, IBM Db2, and cloud-based analytical databases such as Amazon Redshift, Google BigQuery, and Snowflake.

The SQL Execution Agent 214 establishes connections to the External Databases 226 through the network 102 using standard database connectivity protocols such as JDBC, ODBC, native database drivers, or database-specific APIs. The SQL Execution Agent 214 implements connection pooling to efficiently manage database connections, implements timeout mechanisms to prevent hanging on long-running queries, and implements transaction management to ensure data consistency when multiple related queries must be executed atomically.

Upon executing each SQL query, the SQL Execution Agent 214 retrieves the result set, which may comprise tabular data, scalar values, time-series data, or hierarchical data structures. The SQL Execution Agent 214 stores the query results in the Shared State Repository 208 along with metadata including query execution timestamp, execution duration, number of rows returned, database connection parameters, and validation status. If execution completes successfully and returns meaningful results, the hypothesis is marked as validated in the Shared State Repository 208. If execution fails, the hypothesis is marked as failed with associated error information for processing by the Query Debugging Agent 216.

The Query Debugging Agent 216 is invoked when SQL query execution by the SQL Execution Agent 214 results in errors, failures, or inconsistent results requiring refinement. The Query Debugging Agent 216 retrieves failed query information from the Shared State Repository 208, including the original SQL query, the associated hypothesis, database error messages, and contextual information about the data schema and execution environment. The Query Debugging Agent 216 analyzes the root cause and implements corrective measures to enable successful query execution.

The Query Debugging Agent 216 handles multiple categories of query failures including syntax errors, semantic errors, type mismatches, referential integrity violations, division-by-zero errors, timeout errors, resource-exhaustion errors, and permission errors. For syntax errors, the Query Debugging Agent 216 applies grammar-correction rules and validates SQL keyword usage. For semantic errors, the Query Debugging Agent 216 cross-references schema metadata in the Shared State Repository 208 to identify correct table and column names. For type mismatches, the Query Debugging Agent 216 applies appropriate type-casting functions. For division-by-zero conditions, the Query Debugging Agent 216 introduces conditional logic to avoid computation errors. For timeout or resource-exhaustion errors, the Query Debugging Agent 216 simplifies or restructures queries to reduce computational load.

In one embodiment, the Query Debugging Agent 216 employs a machine-learning model trained on historical query failures and corresponding corrections to predict debugging strategies. In another embodiment, the Query Debugging Agent 216 attempts a sequence of corrective strategies iteratively until successful execution is achieved or until a predefined limit is reached. If debugging fails entirely, the Query Debugging Agent 216 may refine the underlying hypothesis instead of the SQL query and may mark the hypothesis as unvalidatable with recommendations for future schema enhancements. All debugging actions are logged in the Shared State Repository 208. Successfully debugged queries are re-executed by the SQL Execution Agent 214 and marked as validated if execution completes successfully.

The Result Aggregation and Visualization Agent 218 processes validated SQL query results retrieved from the Shared State Repository 208 and generates textual interpretations and graphical visualizations that illustrate the business insights. The Result Aggregation and Visualization Agent 218 comprises a result interpretation component and a visualization-generation component.

The integration between the business insight extraction system 202 and External BI 230 enables bidirectional data and insight flow. The integration interfaces are configured to retrieve the plurality of structured data tables from the external systems, such as databases, data warehouses, or enterprise applications, and to provide those tables to the Data Investigation Agent 210 and other components of the system 202. The integration interfaces are also configured to export at least a portion of the business insight report or the one or more visualizations to the external business-intelligence tools, enabling the validated insights and visual artifacts generated by the system 202 to be embedded into existing dashboards, reporting environments, or decision-support workflows.

In one direction, the system 202 can export generated insights, visualizations, and reports to External BI 230 tools through the API 224, allowing organizations to incorporate AI-generated insights into their existing BI dashboards and reporting infrastructure. The exported data may be formatted in BI-tool-specific formats (e.g., Tableau Data Extracts, Power BI datasets) or in standard formats (CSV, JSON, Parquet) that can be imported into any BI platform. The visualizations generated by the Result Aggregation and Visualization Agent 218 can be embedded in External BI 230 dashboards as images, interactive web components, or through native integration APIs.

In the reverse direction, the business insight extraction system 202 can leverage External BI 230 as data sources, pulling curated datasets, pre-aggregated metrics, or dimension tables maintained within BI platforms for use in hypothesis generation and validation. This enables the system 202 to benefit from data quality improvements, business logic enforcement, and metric standardization performed within the BI environment. The integration allows organizations to maintain a unified business intelligence ecosystem where AI-powered autonomous insight generation complements human-driven exploratory analysis and standard reporting, providing a comprehensive approach to data-driven decision-making.

The ERP 232 (enterprise resource planning) system comprises integrated business management software that manages core business processes including finance, accounting, procurement, manufacturing, supply chain, project management, human resources, and other operational functions. The ERP 232 may be implemented using commercial ERP platforms such as SAP ERP or S/4HANA, Oracle E-Business Suite or Oracle Cloud ERP, Microsoft Dynamics 365, Infor CloudSuite, Epicor ERP, NetSuite, or industry-specific ERP systems tailored to particular verticals (e.g., manufacturing, retail, healthcare).

The ERP 232 contains extensive structured data across multiple business modules including: financial data (general ledger, accounts payable, accounts receivable, fixed assets, budgets, forecasts); human capital management data (employee records, payroll, benefits, time tracking, performance management); supply chain data (inventory levels, supplier information, purchase orders, goods receipts, warehouse operations); manufacturing data (production schedules, work orders, bill of materials, routing, capacity planning); project management data (project definitions, work breakdown structures, resource assignments, time and expense tracking, project budgets and actuals); and sales and distribution data (customer orders, shipments, invoicing, pricing, contracts).

The integration between the business insight extraction system 202 and ERP 232 enables comprehensive enterprise-wide analytics that span multiple business functions. The Data Investigation Agent 210 can analyze ERP database schemas to understand the complex relationships between different ERP modules and tables. The Hypothesis Generation Agent 212 can formulate cross-functional hypotheses such as: analyzing the relationship between project resource allocation (from the project management module) and project profitability (from the financial module); correlating employee utilization data (from the HCM module) with project delivery performance (from the project management module); examining inventory turnover rates (from the supply chain module) in relation to sales patterns (from the sales module); or evaluating procurement efficiency by comparing purchase order cycle times with supplier performance metrics.

The SQL Execution Agent 214 generates queries that navigate the complex ERP data models, properly joining tables across different modules, applying appropriate filters for organizational hierarchies, legal entities, or business units, and correctly interpreting ERP-specific semantics such as fiscal period definitions, currency conversions, organizational assignments, and approval workflows. Generating insights from ERP data enables the business insight extraction system 202 to address strategic questions related to operational efficiency, cost optimization, resource allocation, financial performance, and cross-functional process improvement that require integration of data from multiple ERP modules.

The Human Expert 234 represents business intelligence professionals, data analysts, business analysts, data scientists, domain experts, or other human stakeholders who interact with the business insight extraction system 202 to guide, validate, refine, or consume the generated insights and reports. The Human Expert 234 interfaces with the system 202 through User Device 236, utilizing the API 224 and the network 102 for communication.

The Human Expert 234 participates in the insight-generation workflow through multiple interaction modes:

(1) query specification: providing natural-language questions, specifying analytical priorities, defining business contexts, or configuring hypothesis-generation parameters to guide the types of insights the system 202 should pursue;

(2) feedback provision: reviewing generated insights, visualizations, and reports, providing qualitative assessments that complement the automated feedback from the Feedback Agent 222, correcting misinterpretations, and identifying insights of particular value or relevance;

(3) hypothesis refinement: suggesting modifications to generated hypotheses based on domain knowledge, business intuition, or awareness of organizational priorities not captured in the data;

(4) validation and quality assurance: reviewing SQL queries for logical correctness, verifying interpretations for business accuracy, and ensuring visualizations effectively communicate the intended insights;

(5) report customization: selecting which insights to include in final reports, organizing content for specific audiences, adding executive summaries or commentary, and formatting reports according to organizational standards; and (6) system configuration: adjusting scoring weights used by the Feedback Agent 222, defining relevance criteria aligned with strategic priorities, specifying data sources and access credentials, and configuring report templates.

The Human Expert 234 provides critical domain knowledge and contextual understanding that cannot be fully captured in structured data or automated algorithms. For example, the Human Expert 234 may identify that a particular time period contains anomalous data due to a one-time event (e.g., organizational restructuring, system migration, external market shock) that should be considered when interpreting trends. The Human Expert 234 may recognize that certain metrics are strategically important to executive stakeholders even if they do not score highly on automated relevance assessments. The Human Expert 234 may identify emerging business priorities or strategic initiatives that should be reflected in hypothesis generation but are not yet represented in historical data patterns.

The system 202 is designed to augment rather than replace human expertise, with the multi-agent AI framework automating labor-intensive, repetitive aspects of business intelligence (schema analysis, query generation, query debugging, basic interpretation) while leaving high-value judgment, strategic alignment, and nuanced interpretation to the Human Expert 234. This human-AI collaboration enables more efficient and effective business intelligence operations, allowing experts to focus their time on high-impact analytical questions rather than mechanical data manipulation tasks. The feedback and guidance provided by the Human Expert 234 are incorporated into the Shared State Repository 208 and used by the Refinement Agent to continuously improve the system's alignment with organizational needs and preferences.

The User Device 236 represents computing devices through which end users, business stakeholders, executives, managers, analysts, or other personnel interact with the business insight extraction system 202 to submit queries and consume generated Output Reports 238. The User Device 236 may be implemented as desktop computers running operating systems such as Windows, macOS, or Linux; laptop computers providing portable access; tablet devices (e.g., iPad, Android tablets, Microsoft Surface) offering touch-based interaction; smartphones (e.g., iPhone, Android phones) enabling mobile access to insights; or specialized business intelligence terminals or kiosks deployed in operational environments.

The User Device 236 comprises essential computing components including: one or more processors capable of executing application software; memory for active data processing; persistent storage for storing applications and cached data; input devices such as keyboards, mice, touch-screens, styluses, voice-input microphones, or gesture-recognition cameras enabling user interaction; output devices such as display screens for visual presentation, speakers or headphones for audio feedback, or haptic feedback mechanisms for tactile interaction; and network interfaces such as Wi-Fi adapters, Ethernet ports, or cellular modems enabling connectivity.

Users interact with the business insight extraction system 202 through various software applications running on the User Device 236:

(1) web browsers accessing web-based interfaces hosted by the system 202 or rendering HTML-format Output Reports 238;

(2) dedicated mobile or desktop applications designed for business-insight consumption;

(3) business-intelligence client applications that integrate system-generated insights with other BI content;

(4) email clients receiving Output Reports 238 as attachments or embedded content; (5) document-viewing applications for consuming reports in formats such as PDF or DOCX; or (6) collaboration platforms where reports are shared and discussed among teams.

The User Device 236 receives Output Reports 238 through multiple delivery mechanisms including interactive web pages, downloaded files, embedded dashboard content, email delivery, push notifications, or conversational interfaces providing natural-language summaries of insights.

In various embodiments, the User Device 236 provides interactive capabilities enabling users to drill down into summary insights, filter or slice visualizations, export data subsets or charts, annotate insights, share insights with colleagues, trigger follow-up analyses, or provide feedback ratings that are transmitted back to the Feedback Agent 222. The User Device 236 maintains secure authenticated sessions with the business insight extraction system 202, implementing session tokens, automatic timeout, encrypted communication channels, or biometric authentication to protect sensitive business-intelligence data.

The Output Reports 238 comprise the finalized business-insight reports generated by the Report Generation Agent 220 and delivered to the User Device 236 for consumption by business stakeholders. The Output Reports 238 represent the culmination of the entire multi-agent workflow, synthesizing data from the External Databases 226, the CRM 228, the ERP 232, and other sources into actionable business intelligence presented in structured, comprehensible formats tailored to specific audiences and business contexts.

Each Output Report 238 contains components organized in a logical, hierarchical structure including an executive summary, table of contents, introduction and methodology, detailed insight sections, cross-insight synthesis, unvalidated hypotheses, data-quality and limitations sections, appendices, and metadata. The Output Reports 238 may be generated in formats such as HTML, PDF, DOCX, PPTX, Markdown, JSON, XML, interactive dashboards, or mobile-optimized layouts.

The Output Reports 238 incorporate visual-design principles such as consistent color schemes, clear visual hierarchy, appropriate use of charts, and accessibility features including color contrast, alternative text, semantic structure, and keyboard navigation support. Interactive elements may include expandable sections, interactive filters, data export functions, annotation tools, sharing mechanisms, feedback widgets, drill-through links, or follow-up query triggers.

The Output Reports 238 are delivered to the User Device 236 through distribution channels including real-time web presentation, scheduled delivery, event-triggered distribution, on-demand generation, push notifications, or integration with collaboration platforms. All delivered Output Reports 238 maintain security and access controls ensuring that sensitive business intelligence reaches only authorized recipients.

The operational workflow of the business insight extraction system 202 proceeds through a coordinated sequence of agent invocations and data transformations, with state persistence maintained in the Shared State Repository 208. The workflow begins when a user submits an analytical request or query through the User Device 236. The request is transmitted across the network 102 through the API 224 to the system 202, where it is received by the processor 204 for processing.

The Data Investigation Agent 210 is activated as the initial workflow stage, establishing connections to the External Databases 226, the CRM 228, the ERP 232, and other data sources through the network 102 and the API 224. The Data Investigation Agent 210 executes schema introspection queries to extract table structures, column definitions, data types, key relationships, constraints, and statistical properties of the data. The Data Investigation Agent 210 performs data-profiling operations including cardinality analysis, value-distribution examination, and data-quality assessment. The resulting schema metadata and data-profile information are stored in the Shared State Repository 208.

The Hypothesis Generation Agent 212 retrieves the schema metadata from the Shared State Repository 208 and formulates a plurality of candidate business-insight hypotheses using template-based generation rules, domain-specific heuristics, or machine-learning models. The Hypothesis Generation Agent 212 ranks the hypotheses according to business value, data availability, and validation feasibility, and stores them in the Shared State Repository 208.

The SQL Execution Agent 214 retrieves prioritized hypotheses from the Shared State Repository 208 and translates them into executable SQL queries. The SQL Execution Agent 214 executes the queries against the appropriate data sources via connections established through the network 102 and the API 224. Query results and metadata are stored in the Shared State Repository 208.

When SQL execution fails, the Query Debugging Agent 216 retrieves the failed queries and error messages from the Shared State Repository 208, applies diagnostic algorithms to identify root causes, and implements corrective measures. The Query Debugging Agent 216 writes corrected queries and revised hypotheses to the Shared State Repository 208. Corrected queries are re-executed by the SQL Execution Agent 214.

The Result Aggregation and Visualization Agent 218 retrieves the validated query results from the Shared State Repository 208 and generates textual interpretations and visualizations. The visualizations may include bar charts, line charts, pie charts, or other types based on characteristics of the validated insight data. The Result Aggregation and Visualization Agent 218 generates executable visualization code that, when executed by a processor, renders the selected visualization type. The Result Aggregation and Visualization Agent 218 stores visualization code, rendered output, and interpretations in the Shared State Repository 208.

The Report Generation Agent 220 compiles validated insights, queries, results, visualizations, and interpretations into structured Output Reports 238. The Report Generation Agent 220 retrieves content from the Shared State Repository 208, organizes it according to report templates, applies formatting and styling, generates summaries and syntheses, and produces reports in formats such as HTML, PDF, DOCX, or JSON. The Output Reports 238 are transmitted through the API 224 and the network 102 to the User Device 236. The compilation of the business-insight report may include arranging content according to a report template that defines an executive-summary section and multiple insight sections, and may include corresponding failure information or recommendations for candidate hypotheses that fail validation.

The Feedback Agent 222 evaluates the generated insights and reports across multiple quality dimensions. The Feedback Agent 222 retrieves insights and reports from the Shared State Repository 208, applies scoring algorithms assessing relevance, actionability, clarity, accuracy, business impact, and consistency, and stores the feedback scores and qualitative assessments back in the Shared State Repository 208. This feedback is used in subsequent iterations to refine hypothesis generation, query formulation, interpretation quality, and report composition.

Figure 2B:
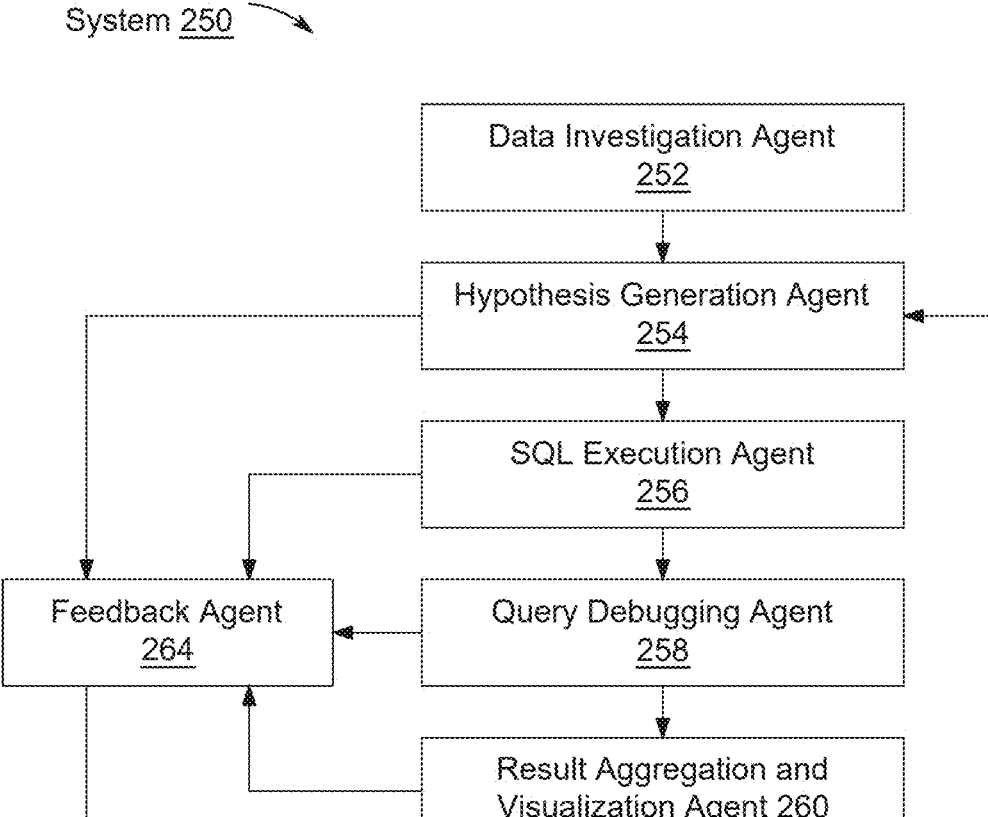
FIG. 2B illustrates a Multi-AI Agentic System, in accordance with some embodiments.

Through the directed flows illustrated in FIG. 2B, the Multi-AI Agentic System 250 implements a hierarchical feedback architecture in which local loops between the SQL Execution Agent 256 and the Query Debugging Agent 258 ensure syntactic and semantic correctness of queries, intermediate loops between the Result Aggregation and Visualization Agent 260 and the Refinement Agent 262 enhance interpretive depth and presentation quality, and a global loop managed by the Feedback Agent 264 shapes overall system behavior across multiple iterations. The Shared State Repository 208 underpins these loops by persisting all intermediate artifacts and evaluation metrics, thereby allowing the Multi-AI Agentic System 250 to resume partially completed workflows, support concurrent processing of multiple hypotheses, and maintain an auditable history of how each finalized business insight evolved through successive agent interactions.

Process

Figure 3:
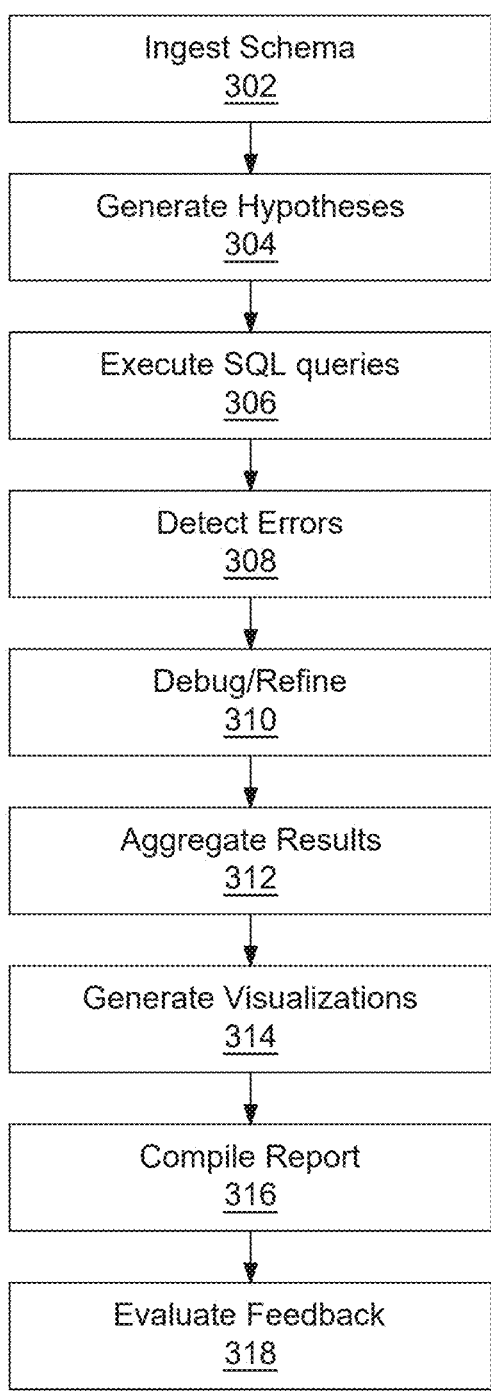
FIG. 3 is a flowchart of a method implemented by the business insight extraction system for ingesting schemas, generating hypotheses, executing SQL queries, detecting and debugging errors, aggregating results, generating visualizations, compiling reports, and evaluating feedback, in accordance with some embodiments.

FIG. 3 illustrates an overview process flow executed by the business insight extraction system 202 and the Multi-AI Agentic System 250 to autonomously generate, validate, and refine business insights from structured data sources. At step 302, the system ingests schema information from structured data tables, such as Employee, Project, and Allocation tables, through the Data Investigation Agent 252. During this step, the Data Investigation Agent 252 analyzes table names, column names, and data types, and records schema metadata and meta-descriptions in the Shared State Repository 208.

At step 304, the Hypothesis Generation Agent 254 generates hypotheses based on the ingested schema and derived metadata. The Hypothesis Generation Agent 254 formulates candidate business insight hypotheses, including but not limited to employee utilization analysis, project cost analysis, and skills-gap analysis, and prioritizes these hypotheses according to estimated business value and validation feasibility.

At step 306, the SQL Execution Agent 256 executes SQL queries that correspond to the generated hypotheses. The SQL Execution Agent 256 automatically synthesizes SQL statements from the hypotheses, issues the queries to the relevant External Databases 226, CRM 228, ERP 232, or other structured data sources through the API 224 and Network 102, and stores the query results and execution metadata in the Shared State Repository 208.

At step 308, the system detects errors associated with query execution. The SQL Execution Agent 256 and the Query Debugging Agent 258 inspect execution outcomes, identify syntax errors, semantic errors, timeout conditions, or data-related inconsistencies, and flag the corresponding hypotheses and queries as failed or incomplete in the Shared State Repository 208.

At step 310, the Query Debugging Agent 258 and the Refinement Agent 262 debug and refine the failed queries and, when necessary, the underlying hypotheses. These agents adjust query structures, correct table or column references, introduce type conversions, simplify overly complex statements, or refine hypothesis definitions. Corrected queries are resubmitted to the SQL Execution Agent 256 until the validations succeed or a termination condition is reached.

At step 312, the Result Aggregation and Visualization Agent 260 aggregates results for successfully validated hypotheses. The Result Aggregation and Visualization Agent 260 consolidates query outputs, computes summary statistics and derived metrics, and prepares structured data objects that support both textual interpretation and visualization.

At step 314, the Result Aggregation and Visualization Agent 260 generates visualizations for the aggregated results. The agent selects appropriate visualization types, such as bar charts, line charts, or other graphics, generates corresponding visualization scripts, and renders visual outputs that capture the validated business insights in an interpretable form.

At step 316, the Report Generation Agent 220 compiles a report from the validated hypotheses, SQL queries, aggregated results, visualizations, and associated interpretations. The Report Generation Agent 220 assembles these elements into Output Reports 238 in one or more formats, such as HTML or PDF, suitable for presentation to Human Experts 234 and other business stakeholders via User Devices 236.

At step 318, the Feedback Agent 264 evaluates feedback on the generated insights and reports. The Feedback Agent 264 collects explicit feedback from Human Experts 234 and implicit feedback from system-level metrics, assigns quality scores based on relevance, actionability, clarity, accuracy, business impact, and consistency, and records those scores in the Shared State Repository 208. The Refinement Agent 262 and upstream agents consume this feedback in subsequent iterations to improve hypothesis generation, query formulation, interpretation, visualization, and report compilation, thereby closing the autonomous feedback-improvement loop illustrated in FIG. 3.

Workflow

Figure 4:
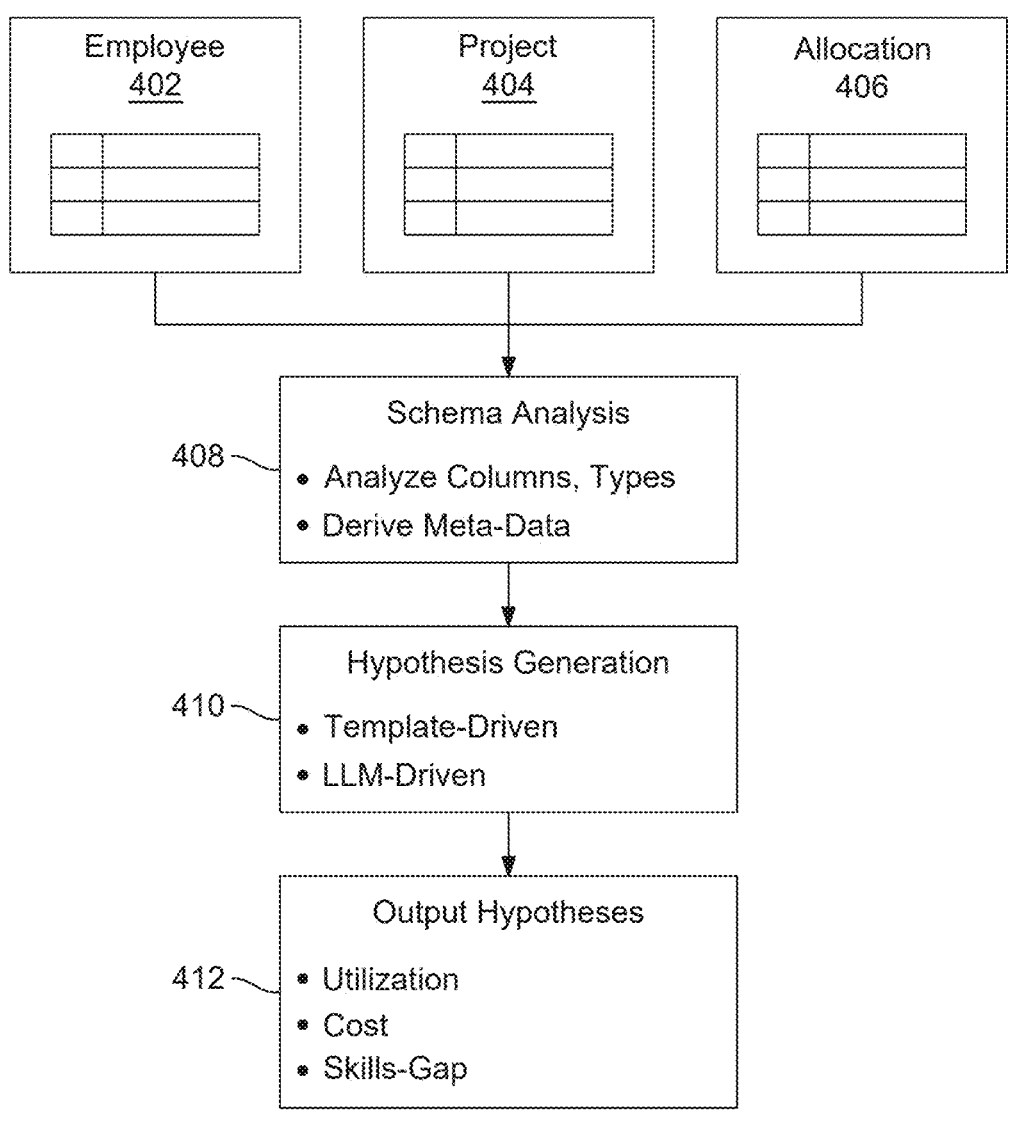
FIG. 4 illustrates an example schema-driven hypothesis generation workflow in which Employee, Project, and Allocation tables are analyzed to derive metadata and to output utilization, cost, and skills-gap hypotheses, in accordance with some embodiments.

FIG. 4 illustrates an example schema-driven hypothesis generation workflow executed by the business insight extraction system 202 and the Multi-AI Agentic System 250 for structured data tables representing Employee, Project, and Allocation information. An Employee table 402, a Project table 404, and an Allocation table 406 are depicted as exemplary structured data tables stored within the External Databases 226. Each of these tables contains rows and columns that encode business entities and relationships, such as employee identifiers, project identifiers, allocation records, cost metrics, and skills attributes.

In a schema analysis stage 408, the Data Investigation Agent 252 performs schema analysis over the Employee table 402, the Project table 404, and the Allocation table 406. The Data Investigation Agent 252 inspects column names, data types, key relationships, and value distributions, and derives meta-data including primary and foreign key relationships between employees, projects, and allocation records. The Data Investigation Agent 252 identifies candidate analytical dimensions, such as department, role, project type, billing rate, and allocation percentage, and records the resulting schema metadata and table meta-descriptions in the Shared State Repository 208.

In a hypothesis generation stage 410, the Hypothesis Generation Agent 254 consumes the schema metadata produced during the schema analysis stage 408 and generates hypotheses using template-driven and Large Language Model-driven mechanisms. Template-driven generation utilizes predefined hypothesis templates that map to common business questions for resource management and project performance, while LLM-driven generation leverages a Large Language Model to formulate additional hypotheses conditioned on the discovered schema. The Hypothesis Generation Agent 254 thereby creates a plurality of structured hypotheses, including utilization-related hypotheses that examine employee or project utilization rates, cost-related hypotheses that analyze project cost behavior or profitability, and skills-gap-related hypotheses that identify mismatches between required and available skills across projects and departments.

An output hypotheses stage 412 represents the set of hypotheses produced by the Hypothesis Generation Agent 254 from the Employee table 402, the Project table 404, and the Allocation table 406. These output hypotheses explicitly include utilization hypotheses, cost hypotheses, and skills-gap hypotheses, and may further include additional hypotheses discovered by the Large Language Model based on the same schema. Each output hypothesis is stored in the Shared State Repository 208 with associated metadata, such as required tables, estimated complexity, and priority scores, and is passed to the SQL Execution Agent 256 for validation in accordance with the processing flow described with reference to FIGS. 2A, 2B, and 3.

Hypothesis Generation

Figure 5:
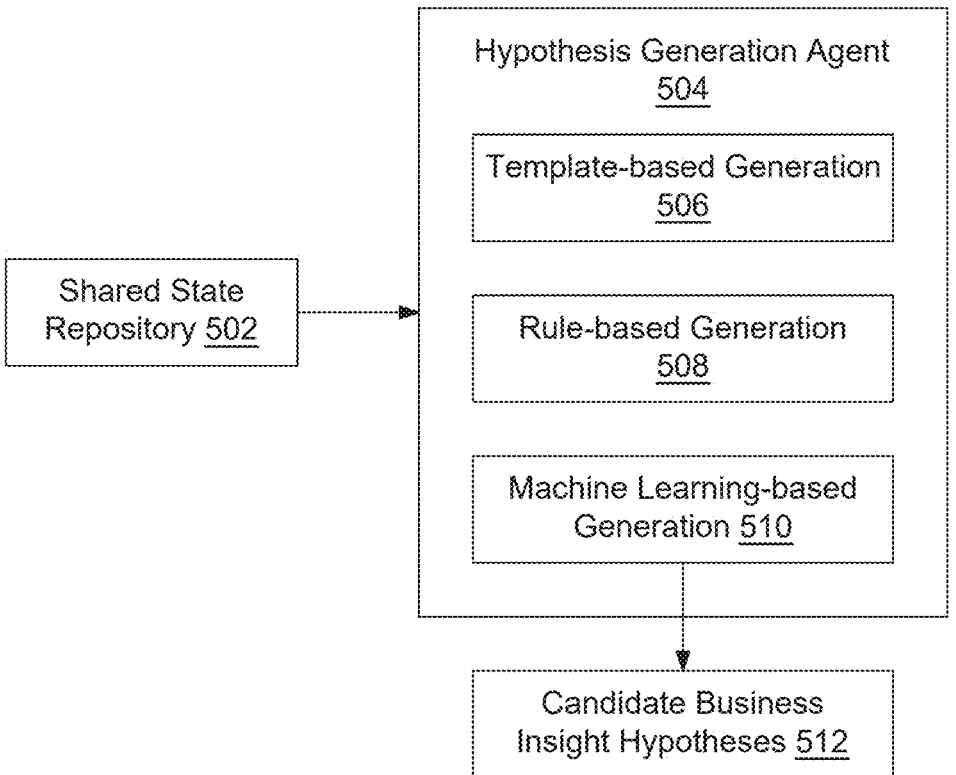
FIG. 5 illustrates a hypothesis generation subsystem implemented within the business insight extraction system, in accordance with some embodiments.

FIG. 5 illustrates a hypothesis generation subsystem implemented within the business insight extraction system. In the illustrated example, a Shared State Repository 502 provides schema metadata and data descriptions to a Hypothesis Generation Agent 504. The Shared State Repository 502 maintains a consolidated representation of information previously derived from one or more structured data sources, such as table schemas, column names, data types, relationships, value distributions, and example records. By reading the schema metadata and data descriptions from the Shared State Repository 502, the Hypothesis Generation Agent 504 operates without directly querying the underlying databases and instead works on a stable, curated view of the available data structures.

The Hypothesis Generation Agent 504 is configured to autonomously formulate candidate business insight hypotheses that can be evaluated downstream by SQL execution and analytics components of the system. Within the Hypothesis Generation Agent 504, multiple generation mechanisms operate in parallel or in sequence to cover different hypothesis types and business-analysis scenarios. As shown, the Hypothesis Generation Agent 504 includes a template-based generation module 506, a rule-based generation module 508, and a machine learning-based generation module 510. Each of these modules consumes the schema metadata and data descriptions supplied from the Shared State Repository 502 and contributes a different style of hypothesis to the overall set of candidate business insight hypotheses.

The template-based generation module 506 maintains a library of parameterized hypothesis templates that reference generic schema patterns, such as "entities with categorical attributes," "time-series measures," or "resource allocations across projects." When the template-based generation module 506 identifies a match between a stored template pattern and the schema metadata retrieved from the Shared State Repository 502, the module instantiates a corresponding hypothesis by substituting concrete table and column names from the current schema. For example, when the schema metadata indicates an employee table with department and salary fields, the template-based generation module 506 may instantiate a hypothesis relating to average salary by department or compensation disparities across business units. In this way, the template-based generation module 506 quickly produces standard business-intelligence hypotheses that are known to be broadly useful across organizations.

The rule-based generation module 508 applies a set of deterministic rules to the schema metadata and data descriptions to infer more complex or domain-aware hypotheses. These rules may capture relationships between tables, such as foreign-key links between employees and projects, or semantic cues derived from column names, such as "start_date," "end_date," "budget," or "status." When such patterns are detected, the rule-based generation module 508 can generate hypotheses that address utilization, throughput, delays, or risk. For instance, when allocation relationships between employees and projects are present in the schema metadata, the rule-based generation module 508 may generate hypotheses regarding resource utilization rates, workload balance across teams, or correlations between staffing levels and project outcomes. The rule-based generation module 508 thus augments the template-based generation module 506 by capturing structured domain knowledge that is not conveniently expressed as fixed templates.

The machine learning-based generation module 510 employs data-driven and language-model-based techniques to propose additional hypotheses that may not be captured by static templates or hand-crafted rules. In some embodiments, the machine learning-based generation module 510 encodes the schema metadata and selected examples of business questions into prompts and submits the prompts to a large language model. The large language model returns natural-language hypothesis statements, which the machine learning-based generation module 510 parses into structured forms suitable for downstream validation. These hypotheses can include descriptive, diagnostic, predictive, and prescriptive formulations, such as identifying factors associated with project delays, forecasting future resource demand, or recommending alternative allocation strategies. Because the machine learning-based generation module 510 can generalize from prior training data, it is capable of proposing analytically meaningful hypotheses even for previously unseen schemas.

The Hypothesis Generation Agent 504 aggregates the outputs from the template-based generation module 506, the rule-based generation module 508, and the machine learning-based generation module 510 into a set of candidate business insight hypotheses 512. Each hypothesis within the candidate business insight hypotheses 512 can be associated with metadata such as required data sources, estimated query complexity, and expected business impact. The Hypothesis Generation Agent 504 writes the candidate business insight hypotheses 512 back to the Shared State Repository 502 or forwards them to subsequent components for SQL generation and validation. By transforming static schema metadata and data descriptions into a rich set of structured hypotheses, the subsystem shown in FIG. 5 enables the overall system to initiate an autonomous, multi-stage business insight workflow without requiring users to manually define the analytical questions.

SQL Generation

Figure 6:
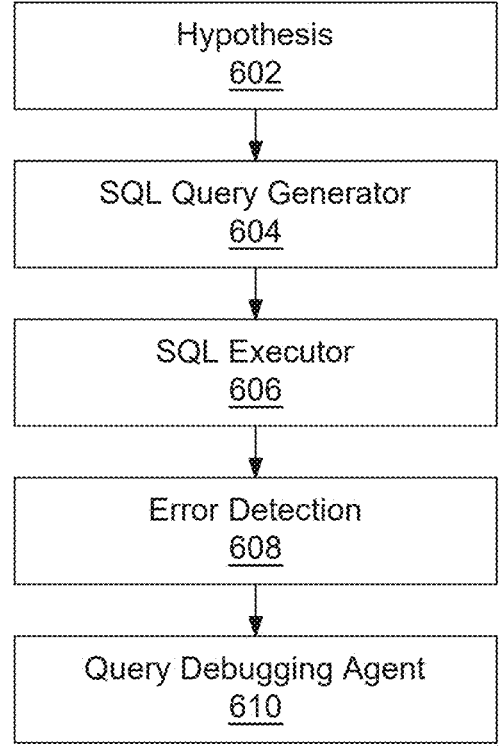
FIG. 6 is a flowchart of a SQL generation, execution, and debugging pipeline that sequentially applies an SQL Query Generator, an SQL Executor, Error Detection, and a Query Debugging Agent to validate hypotheses against structured data sources, in accordance with some embodiments.

FIG. 6 illustrates a SQL generation, execution, and debugging pipeline that operates as a linearized representation of the looped process. A Hypothesis 602 corresponds to a business insight hypothesis produced by the Hypothesis Generation Agent 254 and persisted in the Shared State Repository 208. An SQL Query Generator 604, implemented by the SQL Execution Agent 256, converts the Hypothesis 602 into a concrete SQL query by mapping natural-language hypothesis elements to specific tables, columns, join conditions, filters, and aggregation clauses derived from the schema metadata produced by the Data Investigation Agent 252. An SQL Executor 606, also implemented by the SQL Execution Agent 256, executes the generated query on the External Databases 226, the CRM 228, the ERP 232, or other structured data sources through the API 224 and the Network 102. An Error Detection component 608 evaluates the execution outcome, parses any error codes and messages returned by the database systems, inspects result-set characteristics, and determines whether the query successfully validates the hypothesis or requires remediation. When remediation is required, a Query Debugging Agent 610, implemented by the Query Debugging Agent 258, receives the failing query and associated error context and produces a revised query using the debugging strategies described for the Query Debugging Agent 258. The pipeline of FIG. 6 therefore summarizes, in a sequential form, the progression from hypothesis to SQL query, from execution to error detection, and from error detection to automated debugging within the business insight extraction system 202.

Report Generation

Figure 7:
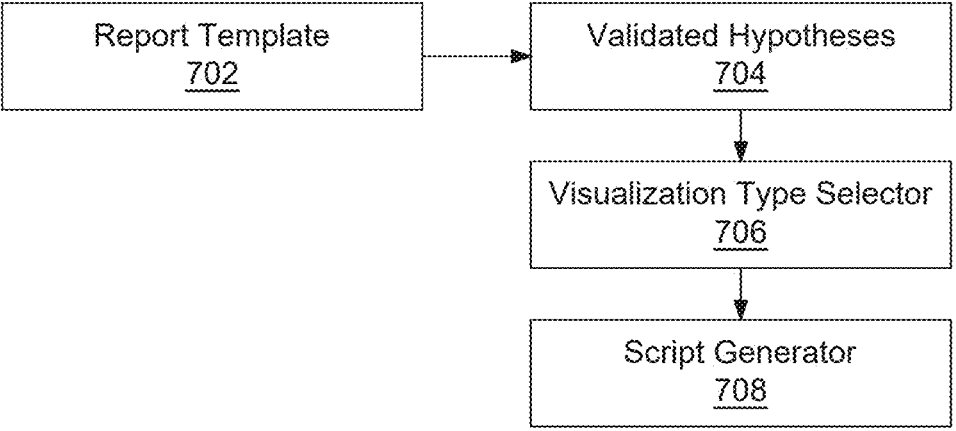
FIG. 7 illustrates a report generation and customization interface, in accordance with some embodiments.

FIG. 7 illustrates a report generation and customization interface that leverages validated insights and visualizations produced by the Result Aggregation and Visualization Agent 260 and the Report Generation Agent 220. A Report Template 702 represents a configurable report structure maintained by the Report Generation Agent 220, including predefined sections such as an executive summary, analytical detail pages, and appendices, along with layout, branding, and formatting rules. Validated Hypotheses 704 represent hypotheses that the SQL Execution Agent 256 and the Query Debugging Agent 258 have successfully validated and that the Result Aggregation and Visualization Agent 260 has processed to produce aggregated metrics and visualization-ready data. The Report Generation Agent 220 populates the Report Template 702 with the Validated Hypotheses 704 and invokes a Visualization Type Selector 706 to determine which visualization types are most appropriate for the data associated with each validated hypothesis. The Visualization Type Selector 706, which operates as a sub-component of the Result Aggregation and Visualization Agent 260 and may employ a Large Language Model for context-aware selection, analyzes the dimensionality, data types, and analytical goals of each validated result and selects chart types such as bar charts, line charts, scatter plots, or heat maps accordingly. A Script Generator 708 then generates visualization scripts implementing the selected visualization types using Python, JavaScript, or React-based visualization frameworks as described for the Result Aggregation and Visualization Agent 260. The Script Generator 708 provides these scripts, along with links to the underlying data and textual interpretations, to the Report Generation Agent 220, which compiles them into Output Reports 238 that are delivered to User Devices 236 for consumption and further customization by Human Experts 234.

Figure 8:
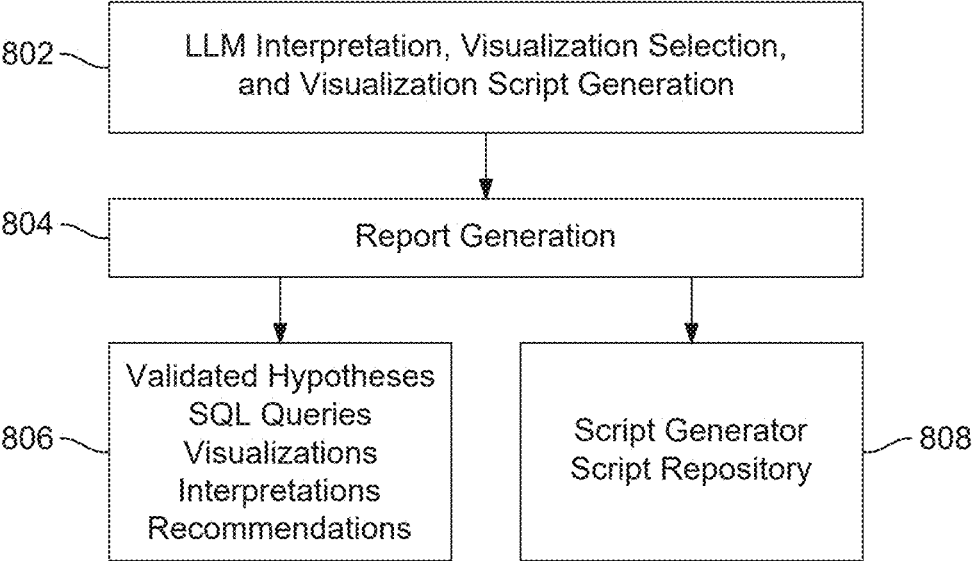
FIG. 8 illustrates a feedback scoring and ranking pipeline, in accordance with some embodiments.

Feedback Scoring and Ranking:

FIG. 8 illustrates a feedback scoring and ranking pipeline that integrates Large Language Model interpretation, visualization selection, report generation, and persistent script storage to support continuous improvement of the business insight extraction system 202. An LLM Interpretation, Visualization Selection, and Visualization Script Generation block 802 represents a stage in which the Result Aggregation and Visualization Agent 260, in conjunction with a Large Language Model, receives validated query results from the SQL Execution Agent 256, generates natural-language interpretations, selects appropriate visualization types, and produces corresponding visualization scripts. A second LLM Interpretation, Visualization Selection, and Visualization Script Generation block 804 represents a refinement stage in which updated interpretations or additional visualization variants are produced in response to prior feedback supplied by the Feedback Agent 264 or Human Experts 234. A Report Generate block 806, implemented by the Report Generation Agent 220, compiles the outputs of these stages, including validated hypotheses, SQL queries, visualizations, interpretations, and recommendations, into one or more Output Reports 238. The compiled artifacts appear collectively in FIG. 8 as a Validated Hypotheses, SQL Queries, Visualizations, Interpretations, Recommendations block, which represents the complete insight package stored in the Shared State Repository 208 and presented to business stakeholders. A Script Generator Script Repository 808 stores visualization scripts and associated metadata produced by the Script Generator 708 and the stages 802 and 804, enabling the Result Aggregation and Visualization Agent 260 and the Report Generation Agent 220 to reuse, adapt, or version visualization code across multiple reports and iterations. The Feedback Agent 264 accesses the contents of the Script Generator Script Repository 808 to evaluate insight quality, assign scores based on relevance, actionability, clarity, accuracy, business impact, and consistency, and rank competing hypotheses and visualizations. These feedback scores and rankings feed back into the Hypothesis Generation Agent 254, the SQL Execution Agent 256, the Query Debugging Agent 258, the Result Aggregation and Visualization Agent 260, and the Report Generation Agent 220, thereby enabling the Multi-AI Agentic System 250 to learn over time which combinations of interpretations, visualizations, and report structures yield the most valuable business insights.

FIG. 9 is a flow diagram illustrating a method for autonomously generating, validating, and refining business insights using structured data tables, according to certain embodiments. One or more processors of the business insight extraction system execute computer-executable instructions to perform the illustrated steps. The method cooperates with the multi-agent architecture and the shared state repository described elsewhere in the specification so that insights evolve over multiple iterations while preserving analytical context.

At step 902, the method receives schema information describing a plurality of structured data tables stored in one or more databases. The schema information can identify table names, column names, data types, key field, relationships, and other metadata that characterize how business entities such as employees, projects, allocations, or financial records are stored. The system may obtain this schema information from catalog services, database introspection queries, or configuration files and store the schema information in the shared state repository for subsequent use.

At step 904, the method automatically generates, based at least in part on the schema information, a plurality of candidate business insight hypotheses without receiving a natural-language query specifying the plurality of candidate business insight hypotheses. The hypothesis generation logic analyzes the schema information to detect patterns such as categorical attributes, temporal attributes, and inter-table relationships and then instantiates templates, rules, or machine-learning-based patterns to formulate hypotheses. As a result, the method produces a set of structured hypotheses that express potential business questions and analyses derived directly from the available data structures.

At step 906, the method generates, for individual ones of the plurality of candidate business insight hypotheses, corresponding structured queries and executes the structured queries against the plurality of structured data tables to obtain query results indicative of whether the individual candidate business insight hypotheses are supported or refuted. Each structured query can be an SQL statement or other declarative query that operationalizes the corresponding hypothesis by computing aggregates, filters, joins, or comparisons over the structured data tables. The method stores the query results together with identifiers of the hypotheses they evaluate.

At step 908, the method detects, for at least one of the structured queries, an execution failure or inconsistency. The detection can occur when a database engine returns a syntax error, a missing column error, a type mismatch, an invalid join, or a timeout, or when the method identifies that the query results violate basic data-quality checks or logical constraints defined for the hypothesis. This step ensures that the system does not treat erroneous or inconsistent results as valid evidence for or against a hypothesis.

At step 910, the method automatically refines, in response to the execution failure or inconsistency, the at least one structured query or the corresponding candidate business insight hypothesis and re-executes a refined structured query. The refinement may adjust table aliases, join conditions, aggregation logic, filters, or grouping keys, or may modify the hypothesis so that it aligns with the actual schema. The method then issues the refined structured query to the databases and obtains updated results. This step allows the system to recover from errors without human intervention and to continue testing hypotheses in a robust fashion.

At step 912, the method aggregates query results for structured queries that successfully execute to form validated insight data associated with corresponding validated hypotheses. The aggregation can combine raw query outputs into normalized measures, summary statistics, or derived metrics that directly support interpretation. The validated insight data explicitly links each metric or statistic to the hypothesis it supports, providing traceability from business conclusions back to the underlying data operations.

At step 914, the method generates, using a large language model, textual interpretations of the validated insight data that describe business implications of the validated hypotheses. The method supplies the validated insight data and contextual prompts to the large language model, which produces narrative explanations written in natural language. These explanations can highlight key trends, anomalies, risks, or opportunities and can relate quantitative results to business objectives, key performance indicators, or operational considerations.

At step 916, the method generates, based on the validated insight data, visualization code configured to render one or more visualizations representing at least a portion of the validated hypotheses and the query results. The visualization code may specify chart types, axes, labels, and styling instructions using libraries such as Python plotting libraries, JavaScript-based visualization frameworks, or other visualization toolkits. The generated code enables subsequent rendering of bar charts, line charts, scatter plots, or other graphical elements that visually communicate the validated insight data to end users.

At step 918, the method compiles a business insight report including at least a subset of the validated hypotheses, the textual interpretations, and the one or more visualizations. The compilation process assembles these elements into a structured report artifact, such as a document, dashboard specification, or web page definition. The report can include sections such as an executive summary, detailed findings, and recommendations, and may group insights by business domain, time horizon, or priority level.

At step 920, the method evaluates individual business insights represented in the business insight report according to a plurality of scoring dimensions to obtain a respective feedback score for each of the individual business insights. The scoring dimensions can include relevance, actionability, clarity, accuracy, business impact, and consistency with other insights. The method may compute these feedback scores using automated heuristics, machine-learning models, explicit user ratings, or a combination thereof. The scores are stored with identifiers of the corresponding insights so that later iterations can reference them.

At step 922, the method refines subsequent execution of at least one of: the generating of the plurality of candidate business insight hypotheses, the generating and executing of the structured queries, the generating of the textual interpretations, the generating of the visualization code, and the compiling of the business insight report, based at least in part on the feedback scores so that quality of the business insights improves over multiple iterations of the method. For example, the method may adjust hypothesis templates, modify query-construction strategies, update prompting schemes for the large language model, or change visualization selection rules in response to feedback. Through this iterative refinement, the method continuously adapts the analytical workflow to produce more accurate, relevant, and impactful business insights over time.

Artificial Intelligence System Implementation

The system described in conjunction with FIG. 1 to FIG. 9 comprises one or more subsystems based on Artificial Intelligence. Implementation of the subsystems based on the Artificial Subsystems is illustrated by FIGS. 10 to 19.

Some implementations of the technology disclosed relate to using a Transformer model to provide an AI system. In particular, the technology disclosed proposes a parallel input, parallel output (PIPO) AI system based on the Transformer architecture. The Transformer model relies on a self-attention mechanism to compute a series of context-informed vector-space representations of elements in the input sequence and the output sequence, which are then used to predict distributions over subsequent elements as the model predicts the output sequence element-by-element. Not only is this mechanism straightforward to parallelize, but as each input's representation is also directly informed by all other inputs' representations, this results in an effectively global receptive field across the whole input sequence. This stands in contrast to, e.g., convolutional architectures which typically only have a limited receptive field.

In one implementation, the disclosed AI system is a multilayer perceptron (MLP). In another implementation, the disclosed AI system is a feedforward neural network. In yet another implementation, the disclosed AI system is a fully connected neural network. In a further implementation, the disclosed AI system is a fully convolution neural network. In a yet further implementation, the disclosed AI system is a semantic segmentation neural network. In a yet another further implementation, the disclosed AI system is a generative adversarial network (GAN) (e.g., CycleGAN, StyleGAN, pixelRNN, text-2-image, DiscoGAN, IsGAN). In a yet another implementation, the disclosed AI system includes self-attention mechanisms like Transformer, Vision Transformer (ViT), Bidirectional Transformer (BERT), Detection Transformer (DETR), Deformable DETR, UP-DETR, DeiT, Swin, GPT, iGPT, GPT-2, GPT-3, various ChatGPT versions, various LLAMA versions, BERT, Span-BERT, ROBERTa, XLNet, ELECTRA, UniLM, BART, T5, ERNIE (THU), KnowBERT, DeiT-Ti, DeiT-S, DeiT-B, T2T-ViT-14, T2T-ViT-19, T2T-ViT-24, PVT-Small, PVT-Medium, PVT-Large, TNT-S, TNT-B, CPVT-S, CPVT-S-GAP, CPVT-B, Swin-T, Swin-S, Swin-B, Twins-SVT-S, Twins-SVT-B, Twins-SVT-L, Shuffle-T, Shuffle-S, Shuffle-B, XCiT-S12/16, CMT-S, CMT-B, VOLO-D1, VOLO-D2, VOLO-D3, VOLO-D4, MoCo v3, ACT, TSP, Max-Deep-Lab, VisTR, SETR, Hand-Transformer, HOT-Net, METRO, Image Transformer, Taming transformer, TransGAN, IPT, TTSR, STTN, Masked Transformer, CLIP, DALL-E, Cogview, UniT, ASH, TinyBert, FullyQT, ConvBert, FCOS, Faster R-CNN+FPN, DETR-DC5, TSP-FCOS, TSP-RCNN, ACT+MKDD (L=32), ACT+MKDD (L=16), SMCA, Efficient DETR, UP-DETR, UP-DETR, VITB/16-FRCNN, VIT-B/16-FRCNN, PVT-Small+RetinaNet, Swin-T+Retina-Net, Swin-T+ATSS, PVT-Small+DETR, TNT-S+DETR, YOLOS-Ti, YOLOS-S, and YOLOS-B.

In one implementation, the disclosed AI system is a convolution neural network (CNN) with a plurality of convolution layers. In another implementation, the disclosed AI system is a recurrent neural network (RNN) such as a long short-term memory network (LSTM), bi-directional LSTM (Bi-LSTM), or a gated recurrent unit (GRU). In yet another implementation, the disclosed AI system includes both a CNN and an RNN.

In yet other implementations, the disclosed AI system can use 1D convolutions, 2D convolutions, 3D convolutions, 4D convolutions, 5D convolutions, dilated or atrous convolutions, transpose convolutions, depthwise separable convolutions, pointwise convolutions, 1×1 convolutions, group convolutions, flattened convolutions, spatial and cross-channel convolutions, shuffled grouped convolutions, spatial separable convolutions, and deconvolutions. The disclosed AI system can use one or more loss functions such as logistic regression/log loss, multi-class cross-entropy/softmax loss, binary cross-entropy loss, mean-squared error loss, L1 loss, L2 loss, smooth L1 loss, and Huber loss. The disclosed AI system can use any parallelism, efficiency, and compression schemes such TFRecords, compressed encoding (e.g., PNG), sharding, parallel calls for map transformation, batching, prefetching, model parallelism, data parallelism, and synchronous/asynchronous stochastic gradient descent (SGD). The disclosed AI system can include upsampling layers, downsampling layers, recurrent connections, gates and gated memory units (like an LSTM or GRU), residual blocks, residual connections, highway connections, skip connections, peephole connections, activation functions (e.g., non-linear transformation functions like rectifying linear unit (ReLU), leaky ReLU, exponential liner unit (ELU), sigmoid and hyperbolic tangent (tanh)), batch normalization layers, regularization layers, dropout, pooling layers (e.g., max or average pooling), global average pooling layers, and attention mechanisms.

The disclosed AI system can be a linear regression model, a logistic regression model, an Elastic Net model, a support vector machine (SVM), a random forest (RF), a decision tree, and a boosted decision tree (e.g., XGBoost), or some other tree-based logic (e.g., metric trees, kd-trees, R-trees, universal B-trees, X-trees, ball trees, locality sensitive hashes, and inverted indexes). The disclosed AI system can be an ensemble of multiple models, in some implementations.

In some implementations, the disclosed AI system can be trained using backpropagation-based gradient update techniques. Example gradient descent techniques that can be used for training the disclosed AI system include stochastic gradient descent, batch gradient descent, and mini-batch gradient descent. Some examples of gradient descent optimization algorithms that can be used to train the disclosed AI system are Momentum, Nesterov accelerated gradient, Adagrad, Adadelta, RMSprop, Adam, AdaMax, Nadam, and AMSGrad.

Transformer Logic

Machine learning is the use and development of computer systems that can learn and adapt without following explicit instructions, by using algorithms and statistical models to analyze and draw inferences from patterns in data. Some of the state-of-the-art models use Transformers, a more powerful and faster model than neural networks alone. Transformers originate from the field of natural language processing (NLP), but can be used in computer vision and many other fields. Neural networks process input in series and weight relationships by distance in the series. Transformers can process input in parallel and do not necessarily weigh by distance. For example, in natural language processing, neural networks process a sentence from beginning to end with the weights of words close to each other being higher than those further apart. This leaves the end of the sentence very disconnected from the beginning causing an effect called the vanishing gradient problem. Transformers look at each word in parallel and determine weights for the relationships to each of the other words in the sentence. These relationships are called hidden states because they are later condensed for use into one vector called the context vector. Transformers can be used in addition to neural networks. This architecture is described here.

Encoder-Decoder Architecture

Figure 10:
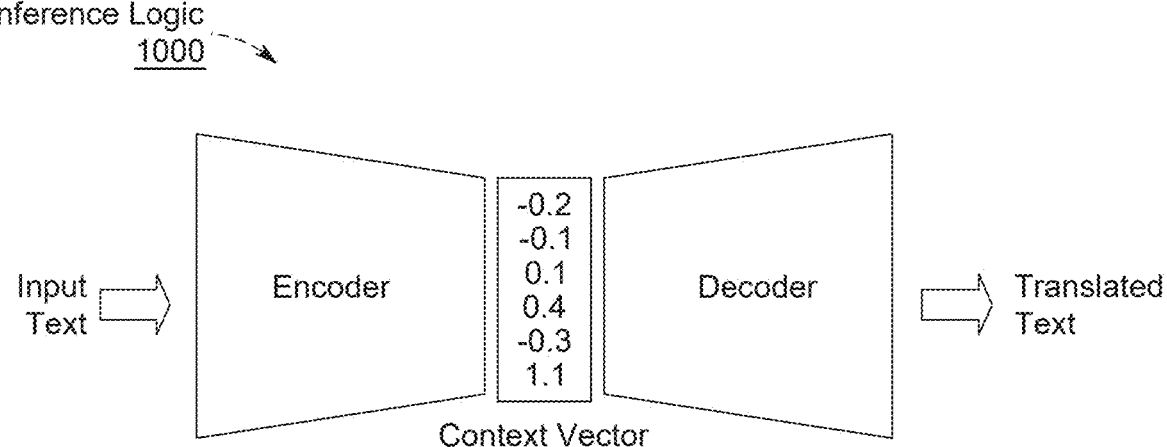
FIG. 10 is a schematic representation of an encoder-decoder architecture.

FIG. 10 is a schematic representation of an encoder-decoder architecture. This architecture is often used for NLP and has two main building blocks. The first building block is the encoder that encodes an input into a fixed-size vector. In the system we describe here, the encoder is based on a recurrent neural network (RNN). At each time step, t, a hidden state of time step, t−1, is combined with the input value at time step t to compute the hidden state at timestep t. The hidden state at the last time step, encoded in a context vector, contains relationships encoded at all previous time steps. For NLP, each step corresponds to a word. Then the context vector contains information about the grammar and the sentence structure. The context vector can be considered a low-dimensional representation of the entire input space. For NLP, the input space is a sentence, and a training set consists of many sentences.

The context vector is then passed to the second building block, the decoder. For translation, the decoder has been trained on a second language. Conditioned on the input context vector, the decoder generates an output sequence. At each time step, t, the decoder is fed the hidden state of time step, t−1, and the output generated at time step, t−1. The first hidden state in the decoder is the context vector, generated by the encoder. The context vector is used by the decoder to perform the translation.

The whole model is optimized end-to-end by using backpropagation, a method of training a neural network in which the initial system output is compared to the desired output and the system is adjusted until the difference is minimized. In backpropagation, the encoder is trained to extract the right information from the input sequence, the decoder is trained to capture the grammar and vocabulary of the output language. This results in a fluent model that uses context and generalizes well. When training an encoder-decoder model, the real output sequence is used to train the model to prevent mistakes from stacking. When testing the model, the previously predicted output value is used to predict the next one.

When performing a translation task using the encoder-decoder architecture, all information about the input sequence is forced into one vector, the context vector. Information connecting the beginning of the sentence with the end is lost, the vanishing gradient problem. Also, different parts of the input sequence are important for different parts of the output sequence, information that cannot be learned using only RNNs in an encoder-decoder architecture.

Attention Mechanism

Figure 11:
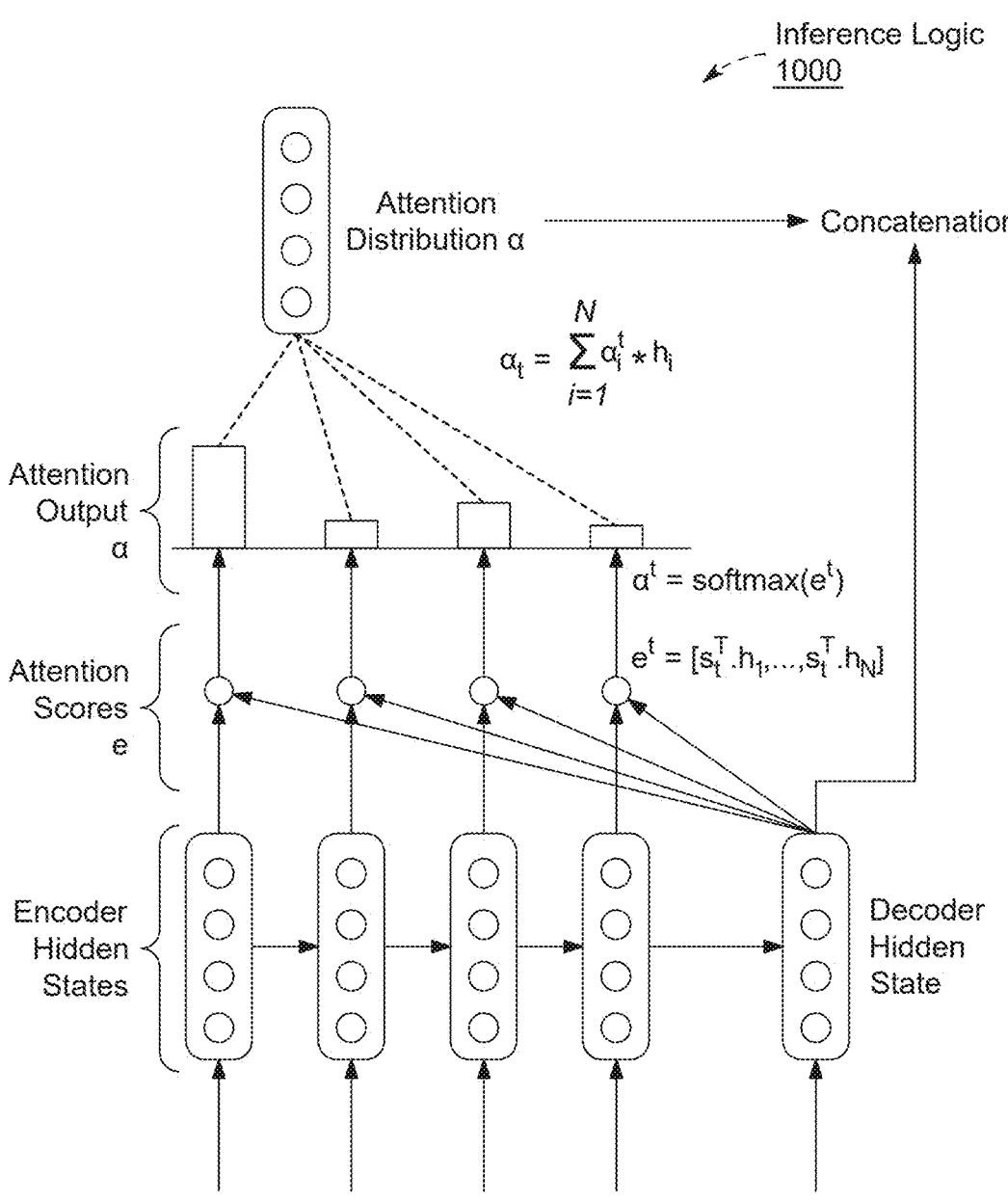
FIG. 11 shows an overview of an attention mechanism added onto an RNN encoder-decoder architecture.

Attention mechanisms distinguish Transformers from other machine learning models. The attention mechanism provides a solution for the vanishing gradient problem. FIG. 11 shows an overview of an attention mechanism added onto an RNN encoder-decoder architecture. At every step, the decoder is given an attention score, e, for each encoder hidden state. In other words, the decoder is given weights for each relationship between words in a sentence. The decoder uses the attention score concatenated with the context vector during decoding. The output of the decoder at time step t is based on all encoder hidden states and the attention outputs. The attention output captures the relevant context for time step t from the original sentence. Thus, words at the end of a sentence may now have a strong relationship with words at the beginning of the sentence. In the sentence "The quick brown fox, upon arriving at the doghouse, jumped over the lazy dog," fox and dog can be closely related despite being far apart in this complex sentence.

To weight encoder hidden states, a dot product between the decoder hidden state of the current time step, and all encoder hidden states, is calculated. This results in an attention score for every encoder hidden state. The attention scores are higher for those encoder hidden states that are similar to the decoder hidden state of the current time step. Higher values for the dot product indicate the vectors are pointing more closely in the same direction. The attention scores are converted to fractions that sum to one using the SoftMax function.

The SoftMax scores provide an attention distribution. The x-axis of the distribution is position in a sentence. The y-axis is attention weight. The scores show which encoder hidden states are most closely related. The SoftMax scores specify which encoder hidden states are the most relevant for the decoder hidden state of the current time step.

The elements of the attention distribution are used as weights to calculate a weighted sum over the different encoder hidden states. The outcome of the weighted sum is called the attention output. The attention output is used to predict the output, often in combination (concatenation) with the decoder hidden states. Thus, both information about the inputs, as well as the already generated outputs, can be used to predict the next outputs.

By making it possible to focus on specific parts of the input in every decoder step, the attention mechanism solves the vanishing gradient problem. By using attention, information flows more directly to the decoder. It does not pass through many hidden states. Interpreting the attention step can give insights into the data. Attention can be thought of as a soft alignment. The words in the input sequence with a high attention score align with the current target word. Attention describes long-range dependencies better than RNN alone. This enables analysis of longer, more complex sentences.

The attention mechanism can be generalized as: given a set of vector values and a vector query, attention is a technique to compute a weighted sum of the vector values, dependent on the vector query. The vector values are the encoder hidden states, and the vector query is the decoder hidden state at the current time step.

The weighted sum can be considered a selective summary of the information present in the vector values. The vector query determines on which of the vector values to focus. Thus, a fixed-size representation of the vector values can be created, in dependence upon the vector query.

The attention scores can be calculated by the dot product, or by weighing the different values (multiplicative attention).

Embeddings

For most machine learning models, the input to the model needs to be numerical. The input to a translation model is a sentence, and words are not numerical. multiple methods exist for the conversion of words into numerical vectors. These numerical vectors are called the embeddings of the words. Embeddings can be used to convert any type of symbolic representation into a numerical one.

Embeddings can be created by using one-hot encoding. The one-hot vector representing the symbols has the same length as the total number of possible different symbols. Each position in the one-hot vector corresponds to a specific symbol. For example, when converting colors to a numerical vector, the length of the one-hot vector would be the total number of different colors present in the dataset. For each input, the location corresponding to the color of that value is one, whereas all the other locations are valued at zero. This works well for working with images. For NLP, this becomes problematic, because the number of words in a language is very large. This results in enormous models and the need for a lot of computational power. Furthermore, no specific information is captured with one-hot encoding. From the numerical representation, it is not clear that orange and red are more similar than orange and green. For this reason, other methods exist.

A second way of creating embeddings is by creating feature vectors. Every symbol has its specific vector representation, based on features. With colors, a vector of three elements could be used, where the elements represent the amount of yellow, red, and/or blue needed to create the color. Thus, all colors can be represented by only using a vector of three elements. Also, similar colors have similar representation vectors.

For NLP, embeddings based on context, as opposed to words, are small and can be trained. The reasoning behind this concept is that words with similar meanings occur in similar contexts. Different methods take the context of words into account. Some methods, like GloVe, base their context embedding on co-occurrence statistics from corpora (large texts) such as Wikipedia. Words with similar co-occurrence statistics have similar word embeddings. Other methods use neural networks to train the embeddings. For example, they train their embeddings to predict the word based on the context (Common Bag of Words), and/or to predict the context based on the word (Skip-Gram). Training these contextual embeddings is time intensive. For this reason, pre-trained libraries exist. Other deep learning methods can be used to create embeddings. For example, the latent space of a variational autoencoder (VAE) can be used as the embedding of the input. Another method is to use 1D convolutions to create embeddings. This causes a sparse, high-dimensional input space to be converted to a denser, low-dimensional feature space.

Self-Attention: Queries (Q), Keys (K), Values (V)

Transformer models are based on the principle of self-attention. Self-attention allows each element of the input sequence to look at all other elements in the input sequence and search for clues that can help it to create a more meaningful encoding. It is a way to look at which other sequence elements are relevant for the current element. The Transformer can grab context from both before and after the currently processed element.

When performing self-attention, three vectors need to be created for each element of the encoder input: the query vector (Q), the key vector (K), and the value vector (V). These vectors are created by performing matrix multiplications between the input embedding vectors using three unique weight matrices.

After this, self-attention scores are calculated. When calculating self-attention scores for a given element, the dot products between the query vector of this element and the key vectors of all other input elements are calculated. To make the model mathematically more stable, these self-attention scores are divided by the root of the size of the vectors. This has the effect of reducing the importance of the scalar thus emphasizing the importance of the direction of the vector. Just as before, these scores are normalized with a SoftMax layer. This attention distribution is then used to calculate a weighted sum of the value vectors, resulting in a vector z for every input element. In the attention principle explained above, the vector to calculate attention scores and to perform the weighted sum was the same, in self-attention two different vectors are created and used. As the self-attention needs to be calculated for all elements (thus a query for every element), one formula can be created to calculate a Z matrix. The rows of this Z matrix are the z vectors for every sequence input element, giving the matrix a size length sequence dimension QKV.

Figure 12:
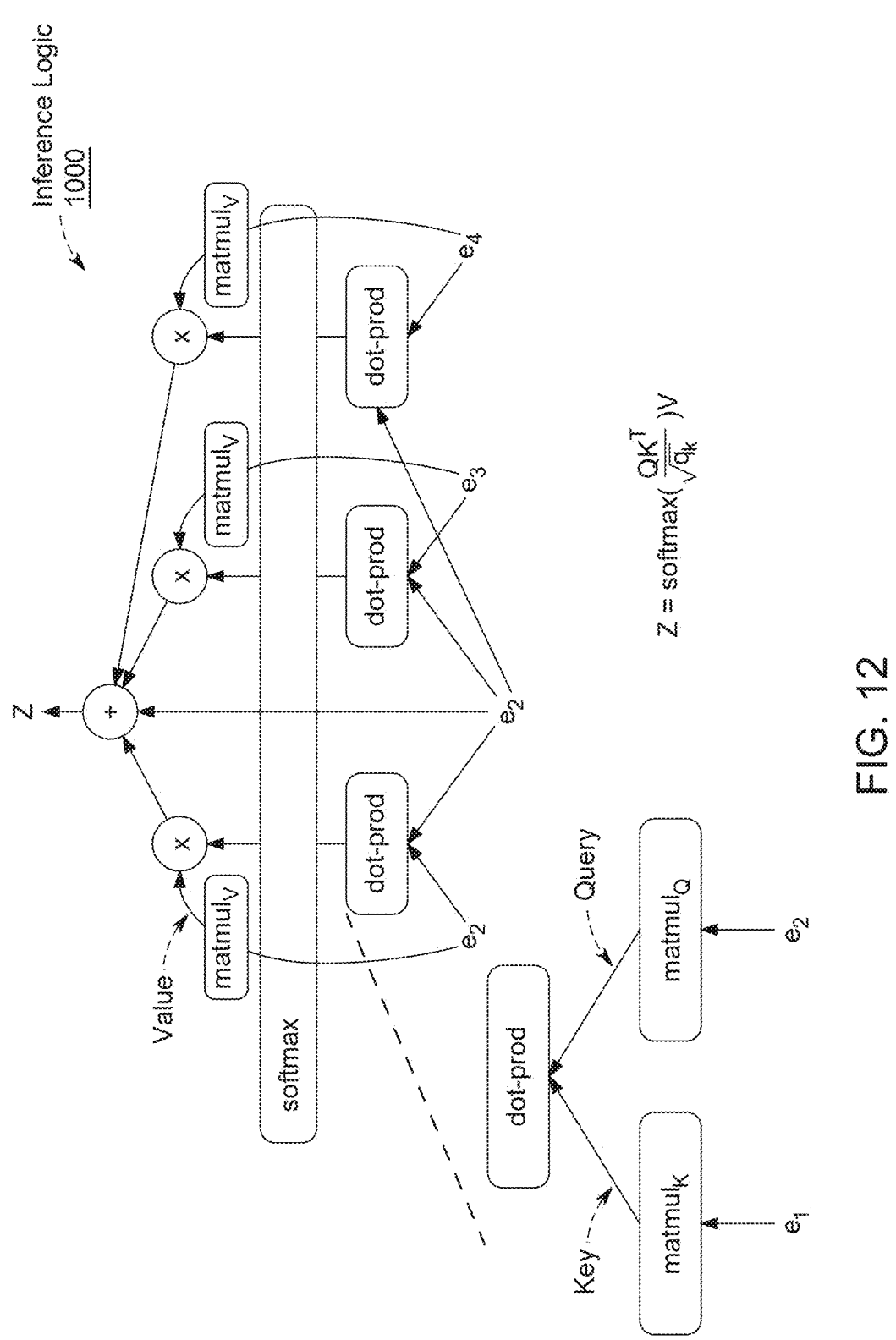
FIG. 12 is a schematic representation of the calculation of self-attention showing one attention head.

Multi-headed attention is executed in the Transformer. FIG. 12 is a schematic representation of the calculation of self-attention showing one attention head. For every attention head, different weight matrices are trained to calculate Q, K, and V. Every attention head outputs a matrix Z. Different attention heads can capture different types of information. The different Z matrices of the different attention heads are concatenated. This matrix can become large when multiple attention heads are used. To reduce dimensionality, an extra weight matrix W is trained to condense the different attention heads into a matrix with the same size as one Z matrix. This way, the amount of data given to the next step does not enlarge every time self-attention is performed.

When performing self-attention, information about the order of the different elements within the sequence is lost. To address this problem, positional encodings are added to the embedding vectors. Every position has its unique positional encoding vector. These vectors follow a specific pattern, which the Transformer model can learn to recognize. This way, the model can consider distances between the different elements.

As discussed above, in the core of self-attention are three objects: queries (Q), keys (K), and values (V). Each of these objects has an inner semantic meaning of their purpose. One can think of these as analogous to databases. We have a user-defined query of what the user wants to know. Then we have the relations in the database, i.e., the values which are the weights. More advanced database management systems create some apt representation of its relations to retrieve values more efficiently from the relations. This can be achieved by using indexes, which represent information about what is stored in the database. In the context of attention, indexes can be thought of as keys. So instead of running the query against values directly, the query is first executed on the indexes to retrieve where the relevant values or weights are stored. Lastly, these weights are run against the original values to retrieve data that is most relevant to the initial query.

Figure 13:
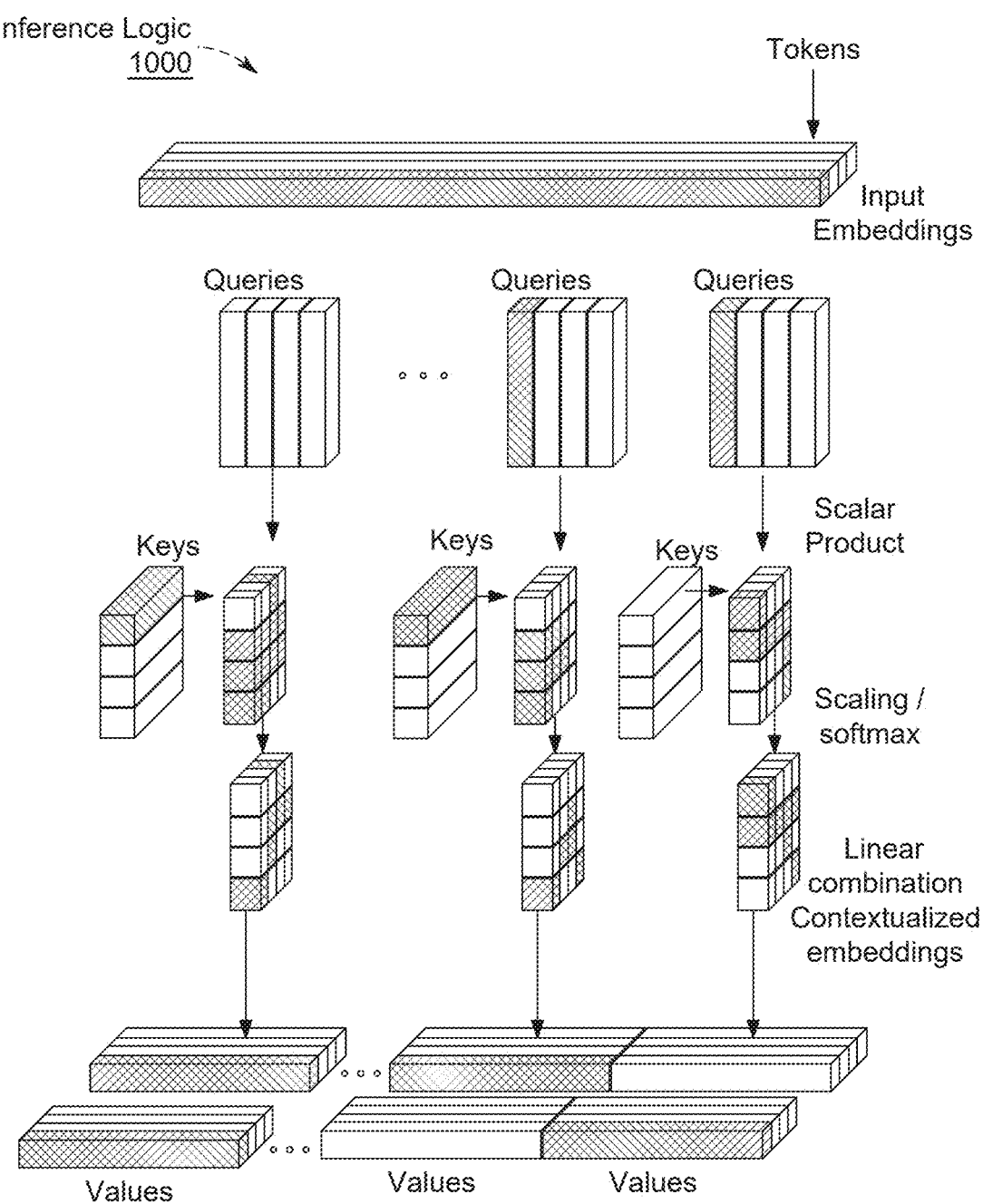
FIG. 13 is a depiction of several attention heads in a Transformer block.

FIG. 13 depicts several attention heads in a Transformer block. We can see that the outputs of queries and keys dot products in different attention heads are differently colored. This depicts the capability of the multi-head attention to focus on different aspects of the input and aggregate the obtained information by multiplying the input with different attention weights.

Examples of attention calculation include scaled dot-product attention and additive attention. There are several reasons why scaled dot-product attention is used in the Transformers. Firstly, the scaled dot-product attention is relatively fast to compute, since its main parts are matrix operations that can be run on modern hardware accelerators. Secondly, it performs similarly well for smaller dimensions of the K matrix, dk, as the additive attention. For larger dk, the scaled dot-product attention performs a bit worse because dot products can cause the vanishing gradient problem. This is compensated via the scaling factor, which is defined as $\sqrt{dk}$.

As discussed above, the attention function takes as input three objects: key, value, and query. In the context of Transformers, these objects are matrices of shapes (n, d), where n is the number of elements in the input sequence and d is the hidden representation of each element (also called the hidden vector). Attention is then computed as:

Attention $$(Q, K, V) = \text{SoftMax}\left(\frac{QK^T}{\sqrt{dk}}\right)V$$

where Q, K, V are computed as:

$X \cdot W_Q,\ X \cdot W_K,\ X \cdot W_V$

X is the input matrix and $W_Q$, $W_K$, $W_V$ are learned weights to project the input matrix into the representations. The dot products appearing in the attention function are exploited for their geometrical interpretation where higher values of their results mean that the inputs are more similar, i.e., pointing in the geometrical space in the same direction. Since the attention function now works with matrices, the dot product becomes matrix multiplication. The SoftMax function is used to normalize the attention weights into the value of 1 prior to being multiplied by the values matrix. The resulting matrix is used either as input into another layer of attention or becomes the output of the Transformer.

Multi-Head Attention

Transformers become even more powerful when multi-head attention is used. Queries, keys, and values are computed the same way as above, though they are now projected into h different representations of smaller dimensions using a set of h learned weights. Each representation is passed into a different scaled dot-product attention block called a head. The head then computes its output using the same procedure as described above.

Formally, the multi-head attention is defined as:

$$\text{MultiHeadAttention}(Q,K,V)=[\text{head}_1, \ldots ,\text{head}_h]W_0$$
$$\text{where head}_1=\text{Attention}$$

$$(QW_i^Q, KW_i^K, VW_i^V)$$

The outputs of all heads are concatenated together and projected again using the learned weights matrix $W_0$ to match the dimensions expected by the next block of heads or the output of the Transformer. Using the multi-head attention instead of the simpler scaled dot-product attention enables Transformers to jointly attend to information from different representation subspaces at different positions.

Figure 14:
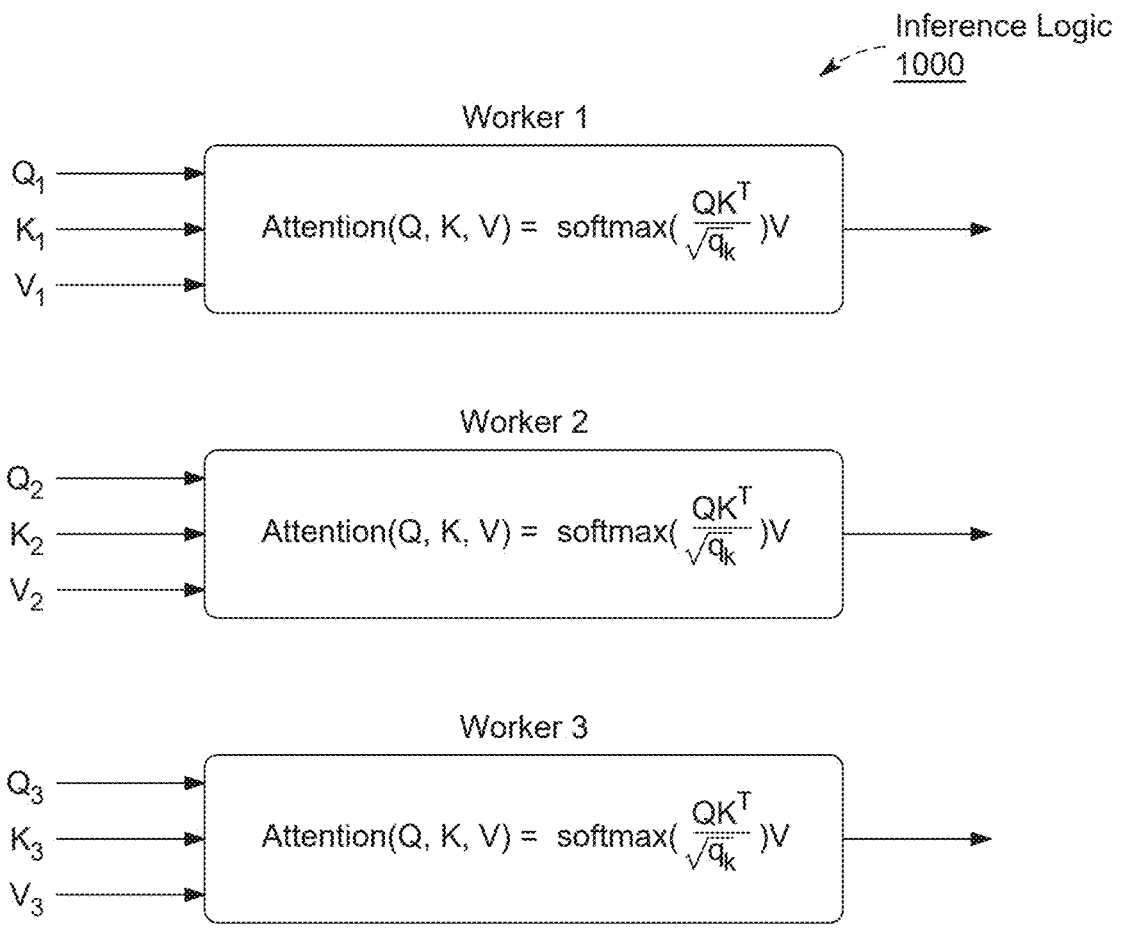
FIG. 14 is an illustration that shows how one can use multiple workers to compute the multi-head attention in parallel, as the respective heads compute their outputs independently of one another.

As shown in FIG. 14, one can use multiple workers to compute the multi-head attention in parallel, as the respective heads compute their outputs independently of one another. Parallel processing is one of the advantages of Transformers over RNNs.

Assuming the naive matrix multiplication algorithm which has a complexity of:

$$a \cdot b \cdot c$$

For matrices of shape (a, b) and (c, d), to obtain values Q, K, V, we need to compute the operations:

$$X \cdot W_Q, X \cdot W_K, X \cdot W_V$$

The matrix X is of shape (n, d) where n is the number of patches and d is the hidden vector dimension. The weights $W_Q$, $W_K$, $W_V$ are all of shape (d, d). Omitting the constant factor 3, the resulting complexity is:

$$n \cdot d^2$$

We can proceed to the estimation of the complexity of the attention function itself, i.e., of
SoftMax $$\left(\frac{QK^T}{\sqrt{dk}}\right)V.$$

The matrices Q and K are both of shape (n, d). The SoftMax transposition operation does not influence the asymptotic complexity of computing the dot product of matrices of shapes (n, d)·(d, n), therefore its complexity is:

$$n^2 \cdot d$$

Scaling by a constant factor of $\sqrt{dk}$, where dk is the dimension of the keys vector, as well as applying the SoftMax function, both have the complexity of a·b for a matrix of shape (a, b), hence they do not influence the asymptotic complexity. Lastly the dot product SoftMax $$\left(\frac{QK^T}{\sqrt{dk}}\right).$$

V is between matrices of shapes (n, n) and (n, d) and so its complexity is:

$$n^2 \cdot d$$

The final asymptotic complexity of scaled dot-product attention is obtained by summing the complexities of computing Q, K, V, and of the following attention function:

$$n \cdot d^2 + n^2 \cdot d.$$

The asymptotic complexity of multi-head attention is the same since the original input matrix X is projected into h matrices of shapes $$\left(n, \frac{d}{h}\right),$$

where h is the number of heads. From the point of view of asymptotic complexity, h is constant, therefore we would arrive at the same estimate of asymptotic complexity using a similar approach as for the scaled dot-product attention.

Transformer models often have the encoder-decoder architecture, although this is not necessarily the case. The encoder is built out of different encoder layers which are all constructed in the same way. The positional encodings are added to the embedding vectors. Afterward, self-attention is performed.

Encoder Block of Transformer

Figure 15:
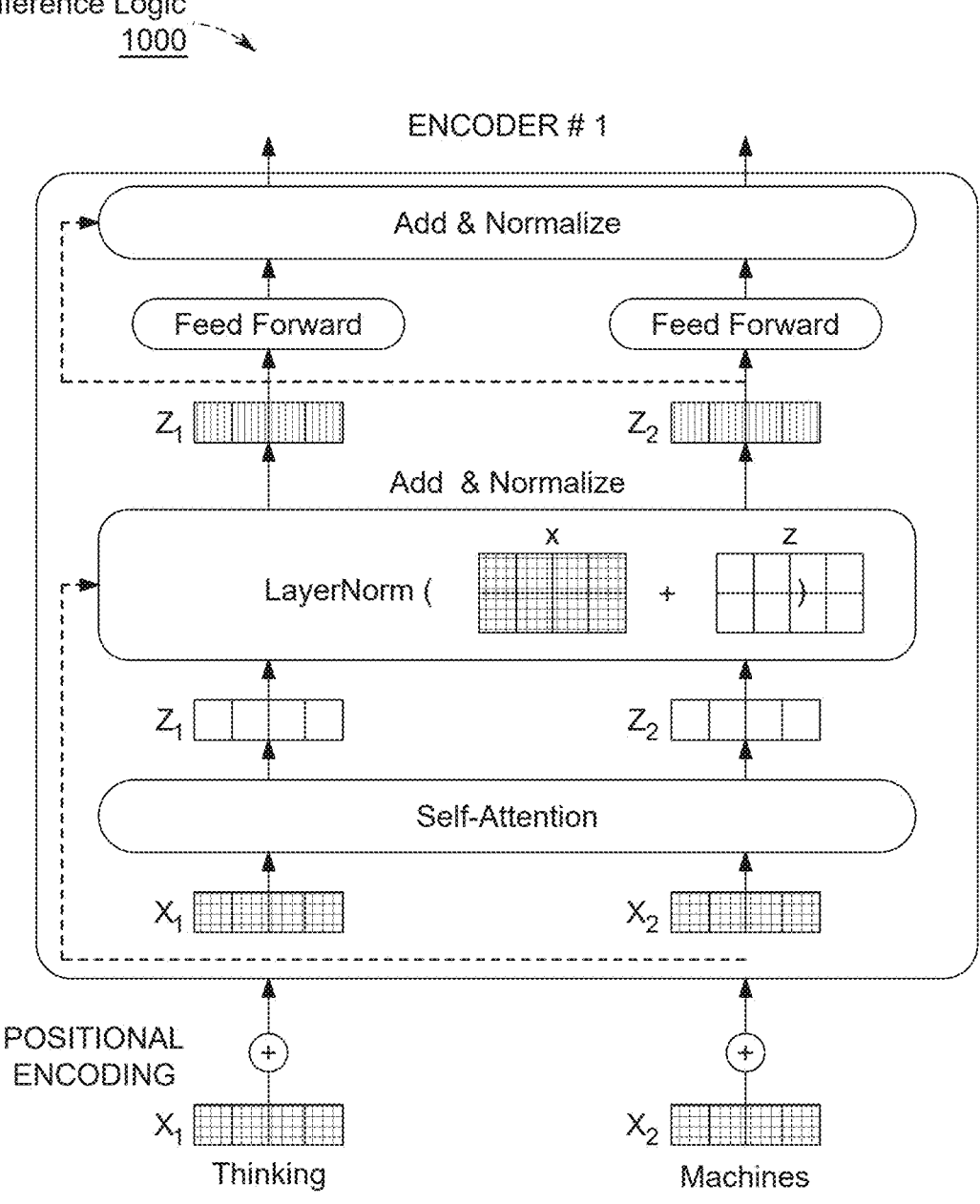
FIG. 15 is a portrayal of one encoder layer of a Transformer network.

FIG. 15 portrays one encoder layer of a Transformer network. Every self-attention layer is surrounded by a residual connection, summing up the output and input of the self-attention. This sum is normalized, and the normalized vectors are fed to a feed-forward layer. Every z vector is fed separately to this feed-forward layer. The feed-forward layer is wrapped in a residual connection and the outcome is normalized too. Often, numerous encoder layers are piled to form the encoder. The output of the encoder is a fixed-size vector for every element of the input sequence.

Just like the encoder, the decoder is built from different decoder layers. In the decoder, a modified version of self-attention takes place. The query vector is only compared to the keys of previous output sequence elements. The elements further in the sequence are not known yet, as they still must be predicted. No information about these output elements may be used.

Encoder-Decoder Blocks of Transformer

Figure 16:
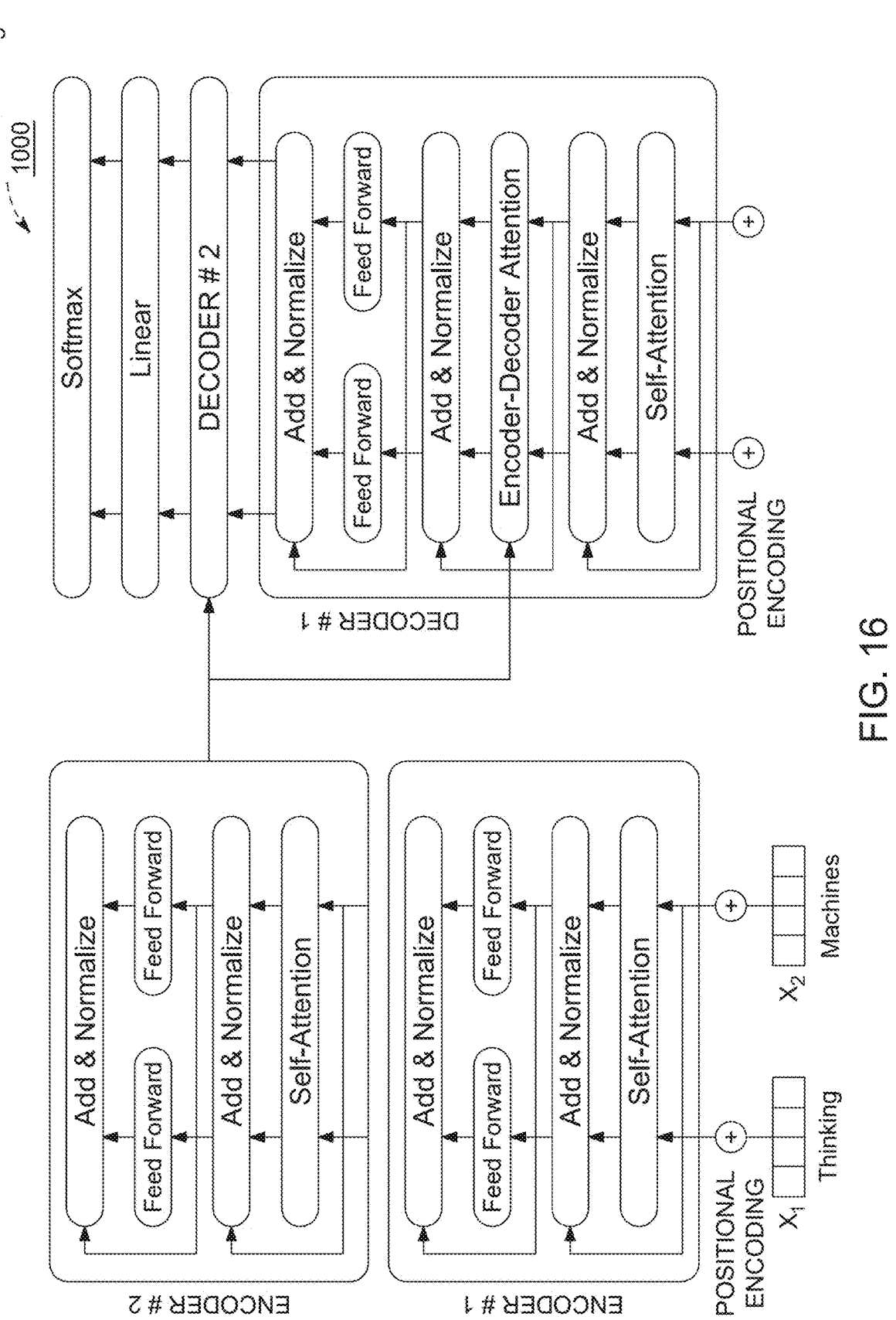
FIG. 16 shows a schematic overview of a Transformer model.
Figures 17A, 17B:
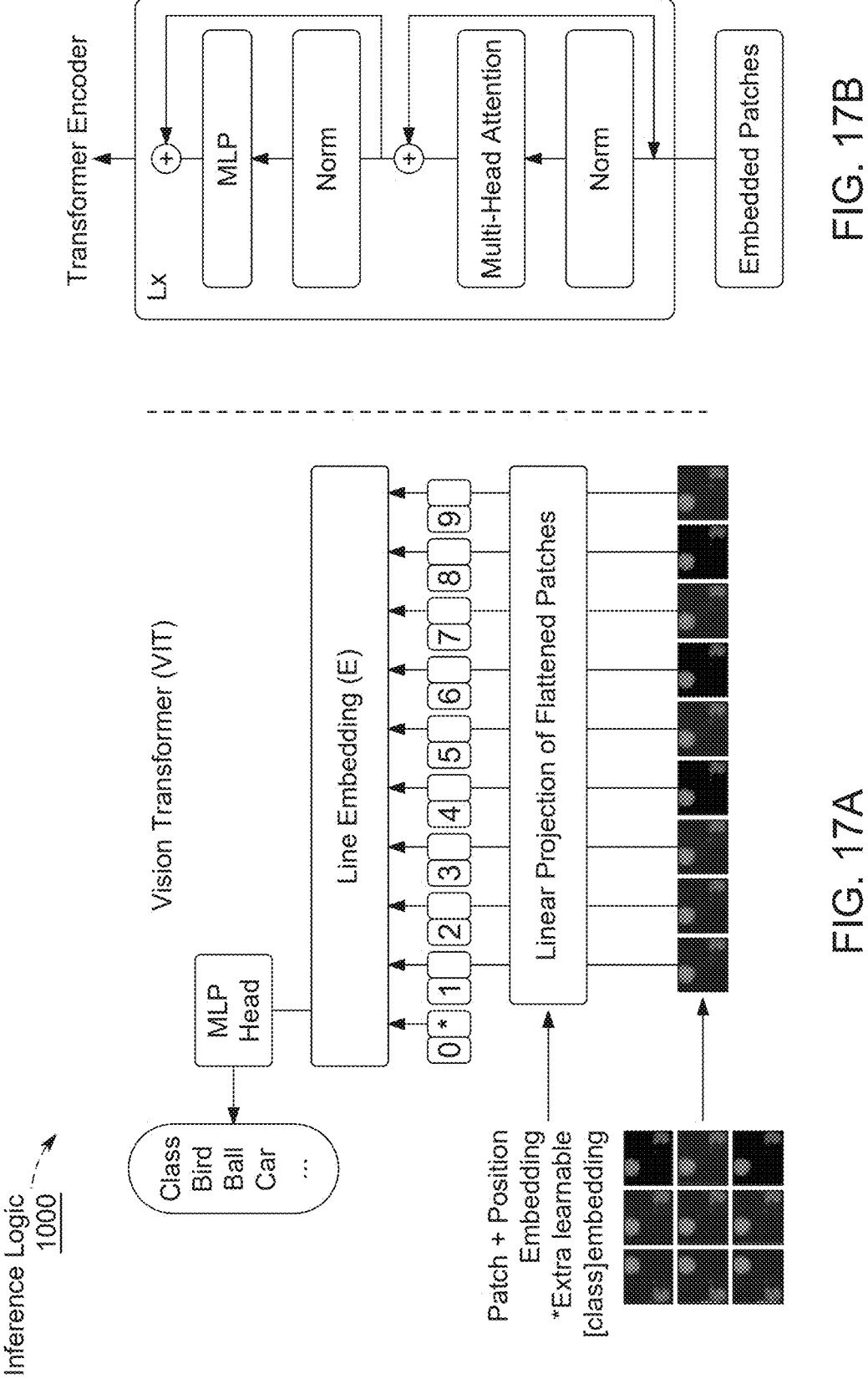
FIGS. 17A and 17B is a depiction of a Vision Transformer (ViT).
Figures 18A, 18B, 18C, 18D:
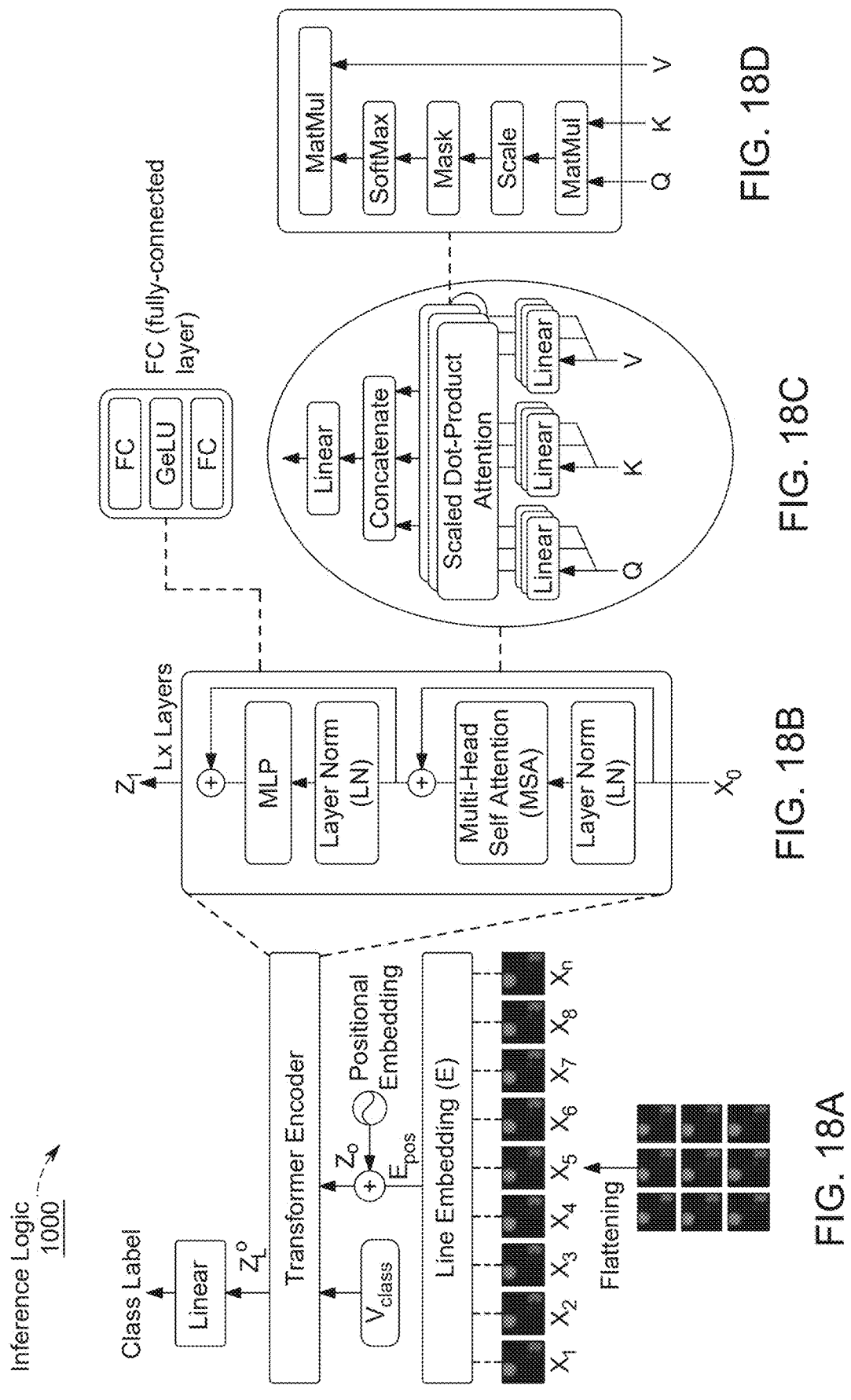
FIG. 18A-D illustrates a processing flow of the Vision Transformer (ViT).

FIG. 16 shows a schematic overview of a Transformer model. Next to a self-attention layer, a layer of encoder-decoder attention is present in the decoder, in which the decoder can examine the last Z vectors of the encoder, providing fluent information transmission. The ultimate decoder layer is a feed-forward layer. All layers are packed in a residual connection. This allows the decoder to examine all previously predicted outputs and all encoded input vectors to predict the next output. Thus, information from the encoder is provided to the decoder, which could improve the predictive capacity. The output vectors of the last decoder layer need to be processed to form the output of the entire system. This is done by a combination of a feed-forward layer and a SoftMax function. The output corresponding to the highest probability is the predicted output value for a subject time step.

For some tasks other than translation, only an encoder is needed. This is true for both document classification and name entity recognition. In these cases, the encoded input vectors are the input of the feed-forward layer and the SoftMax layer. Transformer models have been extensively applied in different NLP fields, such as translation, document summarization, speech recognition, and named entity recognition. These models have applications in the field of biology as well for predicting protein structure and function and labeling DNA sequences.

Vision Transformer

There are extensive applications of transformers in vision including popular recognition tasks (e.g., image classification, object detection, action recognition, and segmentation), generative modeling, multi-modal tasks (e.g., visual-question answering, visual reasoning, and visual grounding), video processing (e.g., activity recognition, video forecasting), low-level vision (e.g., image super-resolution, image enhancement, and colorization) and 3D analysis (e.g., point cloud classification and segmentation).

Transformers were originally developed for NLP and worked with sequences of words. In image classification, we often have a single input image in which the pixels are in a sequence. To reduce the computation required, Vision Transformers (ViTs) cut the input image into a set of fixed-sized patches of pixels. The patches are often 16×16 pixels. They are treated much like words in NLP Transformers. ViTs are depicted in FIGS. 17A, 17B, 18A, 18B, 18C, and 18D. Unfortunately, important positional information is lost because image sets are position-invariant. This problem is solved by adding a learned positional encoding into the image patches.

The computations of the ViT architecture can be summarized as follows. The first layer of a ViT extracts a fixed number of patches from an input image (18A). The patches are then projected to linear embeddings. A special class token vector is added to the sequence of embedding vectors to include all representative information of all tokens through the multi-layer encoding procedure. The class vector is unique to each image. Vectors containing positional information are combined with the embeddings and the class token. The sequence of embedding vectors is passed into the Transformer blocks. The class token vector is extracted from the output of the last Transformer block and is passed into a multilayer perceptron (MLP) head whose output is the final classification. The perceptron takes the normalized input and places the output in categories. It classifies the images. This procedure directly translates into the Python Keras code shown in FIG. 19.

When the input image is split into patches, a fixed patch size is specified before instantiating a ViT. Given the quadratic complexity of attention, patch size has a large effect on the length of training and inference time. A single Transformer block comprises several layers. The first layer implements Layer Normalization, followed by the multi-head attention that is responsible for the performance of ViTs. In the depiction of a Transformer block in FIG. 18B, we can see two arrows. These are residual skip connections. Including skip connection data can simplify the output and improve the results. The output of the multi-head attention is followed again by Layer Normalization. And finally, the output layer is an MLP (Multi-Layer Perceptron) with the GELU (Gaussian Error Linear Unit) activation function.

ViTs can be pretrained and fine-tuned. Pretraining is generally done on a large dataset. Fine-tuning is done on a domain specific dataset.

Domain-specific architectures, like convolutional neural networks (CNNs) or long short-term memory networks (LSTMs), have been derived from the usual architecture of MLPs and suffer from so-called inductive biases that predispose the networks towards a certain output. ViTs stepped in the opposite direction of CNNs and LSTMs and became more general architectures by eliminating inductive biases. A ViT can be seen as a generalization of MLPs because MLPs, after being trained, do not change their weights for different inputs. On the other hand, ViTs compute their attention weights at runtime based on the particular input.

The following detailed description is made with reference to the figures. Example implementations are described to illustrate the technology disclosed, not to limit its scope, which is defined by the claims. Those of ordinary skill in the art will recognize a variety of equivalent variations on the description that follows. Reference will now be made in detail to the exemplary implementations of the present disclosure, examples of which are illustrated in the accompanying drawings. Wherever possible, the same reference numbers will be used throughout the drawings to refer to the same or like parts.

The following discussion is presented to enable any person skilled in the art to make and use the technology disclosed and is provided in the context of a particular application and its requirements. Various modifications to the disclosed implementations will be readily apparent to those skilled in the art, and the general principles defined herein may be applied to other implementations and applications without departing from the spirit and scope of the technology disclosed. Thus, the technology disclosed is not intended to be limited to the implementations shown but is to be accorded the widest scope consistent with the principles and features disclosed herein.

The systems, devices, and methods disclosed herein are described in detail by way of examples and with reference to the figures. The examples discussed herein are examples only and are provided to assist in the explanation of the apparatuses, devices, systems, and methods described herein. None of the features or components shown in the drawings or discussed below should be taken as mandatory for any specific implementation of any of these devices, systems, or methods unless specifically designated as mandatory.

Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

The detailed description of various implementations will be better understood when read in conjunction with the appended drawings. To the extent that the figures illustrate diagrams of the functional blocks of the various implementations, the functional blocks are not necessarily indicative of the division between hardware circuitry. Thus, for example, one or more of the functional blocks (e.g., modules, processors, or memories) may be implemented in a single piece of hardware (e.g., a general-purpose signal processor or a block of random-access memory, hard disk, or the like) or multiple pieces of hardware. Similarly, the programs may be stand-alone programs, may be incorporated as subroutines in an operating system, may be functions in an installed software package, and the like. It should be understood that the various implementations are not limited to the arrangements and instrumentality shown in the drawings.

The processing engines and databases of the figures, designated as modules, can be implemented in hardware or software, and need not be divided up in precisely the same blocks as shown in the figures. Some of the modules can also be implemented on different processors, computers, or servers, or spread among a number of different processors, computers, or servers. In addition, it will be appreciated that some of the modules can be combined, operated in parallel or in a different sequence than that shown in the figures without affecting the functions achieved. The modules in the figures can also be thought of as flowchart steps in a method. A module also need not necessarily have all its code disposed contiguously in memory; some parts of the code can be separated from other parts of the code with code from other modules or other functions disposed in between.

Clauses

The technology disclosed can be practiced as a system, method, or article of manufacture. One or more features of an implementation can be combined with the base implementation. Implementations that are not mutually exclusive are taught to be combinable. One or more features of an implementation can be combined with other implementations. This disclosure periodically reminds the user of these options. Omission from some implementations of recitations that repeat these options should not be taken as limiting the combinations taught in the preceding sections—these recitations are hereby incorporated forward by reference into each of the following implementations.

One or more implementations and clauses of the technology disclosed, or elements thereof can be implemented in the form of a computer product, including a non-transitory computer readable storage medium with computer usable program code for performing the method steps indicated. Furthermore, one or more implementations and clauses of the technology disclosed, or elements thereof can be implemented in the form of an apparatus including a memory and at least one processor that is coupled to the memory and operative to perform exemplary method steps. Yet further, in another aspect, one or more implementations and clauses of the technology disclosed or elements thereof can be implemented in the form of means for carrying out one or more of the method steps described herein; the means can include (i) hardware module(s), (ii) software module(s) executing on one or more hardware processors, or (iii) a combination of hardware and software modules; any of (i)-(iii) implement the specific techniques set forth herein, and the software modules are stored in a computer readable storage medium (or multiple such media).

The clauses described in this section can be combined as features. In the interest of conciseness, the combinations of features are not individually enumerated and are not repeated with each base set of features. The reader will understand how features identified in the clauses described in this section can readily be combined with sets of base features identified as implementations in other sections of this application. These clauses are not meant to be mutually exclusive, exhaustive, or restrictive; and the technology disclosed is not limited to these clauses but rather encompasses all possible combinations, modifications, and variations within the scope of the claimed technology and its equivalents.

Other implementations of the clauses described in this section can include a non-transitory computer readable storage medium storing instructions executable by a processor to perform any of the clauses described in this section. Yet another implementation of the clauses described in this section can include a system including memory and one or more processors operable to execute instructions, stored in the memory, to perform any of the clauses described in this section.

The above-described hardware description is a non-limiting example of corresponding structure for performing the functionality described herein.

Numerous modifications and variations of the present disclosure are possible in light of the above teachings. It is therefore to be understood that the invention may be practiced otherwise than as specifically described herein.

All examples and conditional language recited herein are intended for pedagogical purposes to aid the reader in understanding the principles of the disclosed embodiment and the concepts contributed by the inventor to further the art and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

What is claimed is:

1. A computer-implemented method for autonomously generating, validating, and refining business insights from structured data, the method comprising:

receiving, by one or more processors, schema information describing a plurality of structured data tables stored in one or more databases;

automatically generating, based at least in part on the schema information, a plurality of candidate business insight hypotheses without receiving a natural-language query specifying the plurality of candidate business insight hypotheses;

generating, for individual ones of the plurality of candidate business insight hypotheses, corresponding structured queries and executing the structured queries against the plurality of structured data tables to obtain query results indicative of whether the individual candidate business insight hypotheses are supported or refuted;

detecting, for at least one of the structured queries, an execution failure or inconsistency;

automatically refining, in response to the execution failure or inconsistency, the at least one structured query or the corresponding candidate business insight hypothesis and re-executing a refined structured query;

aggregating query results for structured queries that successfully execute to form validated insight data associated with corresponding validated hypotheses;

generating, using a large language model, textual interpretations of the validated insight data that describe business implications of the validated hypotheses;

generating, based on the validated insight data, visualization code configured to render one or more visualizations representing at least a portion of the validated hypotheses and the query results;

compiling a business insight report including at least a subset of the validated hypotheses, the textual interpretations, and the one or more visualizations;

evaluating individual business insights represented in the business insight report according to a plurality of scoring dimensions to obtain a respective feedback score for each of the individual business insights; and refining subsequent execution of at least one of: the generating of the plurality of candidate business insight hypotheses, the generating and executing of the structured queries, the generating of the textual interpretations, the generating of the visualization code, or the compiling of the business insight report, based at least in part on the feedback scores so that quality of the business insights improves over multiple iterations of the method.

2. The method of claim 1, wherein automatically generating the plurality of candidate business insight hypotheses comprises:

analyzing, from the schema information, relationships, key fields, and value distributions represented in the plurality of structured data tables; and instantiating hypothesis templates that describe potential metrics, correlations, trends, anomalies, or risk conditions across the plurality of structured data tables, including at least one of utilization analysis, cost analysis, skills-gap analysis, risk analysis, or opportunity analysis.

3. The method of claim 1, wherein generating and executing the structured queries comprises automatically constructing structured query language statements for respective candidate business insight hypotheses and executing the structured query language statements against one or more relational databases or data warehouses that store the plurality of structured data tables.

4. The method of claim 1, wherein detecting the execution failure or inconsistency comprises detecting at least one of a syntax error, an invalid join condition, a missing filter, a data-type mismatch, or a runtime performance constraint associated with the at least one structured query.

5. The method of claim 1, wherein refining the at least one structured query or the corresponding candidate business insight hypothesis comprises generating a revised structured query that corrects a detected error while maintaining an intended analytical meaning of the corresponding candidate business insight hypothesis.

6. The method of claim 1, wherein aggregating the query results comprises normalizing, summarizing, or grouping the query results into a machine-readable insight representation that links each validated hypothesis to supporting query results and to one or more source structured queries.

7. The method of claim 1, wherein generating the textual interpretations using the large language model comprises conditioning the large language model on the validated insight data and one or more predefined business objectives so that the textual interpretations include at least one of actionable recommendations, identified risks, or identified opportunities related to the validated hypotheses.

8. The method of claim 1, wherein generating the visualization code comprises:

selecting, based on characteristics of the validated insight data, a visualization type from a plurality of visualization types including at least a bar chart, a line chart, or a pie chart; and generating executable code for at least one charting or visualization library that, when executed by a processor, renders the selected visualization type.

9. The method of claim 8, further comprising storing the visualization code in association with the corresponding validated hypotheses and query results and reusing the stored visualization code to regenerate the one or more visualizations for a subsequent business insight report without re-executing the corresponding structured queries.

10. The method of claim 1, wherein compiling the business insight report comprises:

arranging content according to a report template that defines an executive summary section and a plurality of insight sections; and including, for at least some of the candidate business insight hypotheses that fail validation, corresponding failure information or recommendations for improving a data model or data quality.

11. The method of claim 1, wherein evaluating the individual business insights according to the plurality of scoring dimensions comprises computing, for each business insight, scores for at least relevance, actionability, clarity, accuracy, business impact, and consistency with other insights, and combining the scores to obtain the respective feedback score.

12. The method of claim 11, further comprising ranking the individual business insights based on the respective feedback scores and selecting, for inclusion in the business insight report, a subset of the individual business insights having feedback scores that satisfy a threshold.

13. The method of claim 1, further comprising maintaining, across multiple iterations of the method, a shared state that stores at least the schema information, the plurality of candidate business insight hypotheses, the structured queries, the query results, the visualization code, the feedback scores, and historical report selections, and wherein the refining of the subsequent execution of the generating, executing, generating, or compiling is based at least in part on the shared state.

14. A system for autonomously generating, validating, and refining business insights from structured data, the system comprising:

one or more processors; and one or more non-transitory computer-readable media storing instructions executable by the one or more processors to implement one or more Artificial Intelligence agents comprising:

a data investigation agent configured to receive schema information describing a plurality of structured data tables stored in one or more databases;

a hypothesis generation agent configured to automatically generate, based at least in part on the schema information, a plurality of candidate business insight hypotheses without receiving a natural-language query specifying the plurality of candidate business insight hypotheses;

a SQL execution agent configured to generate, for individual ones of the plurality of candidate business insight hypotheses, corresponding structured queries, to execute the structured queries against the plurality of structured data tables, and to produce query results indicative of whether the individual candidate business insight hypotheses are supported or refuted;

a query debugging agent configured to detect an execution failure or inconsistency associated with at least one of the structured queries, to refine the at least one structured query or a corresponding candidate business insight hypothesis in response to the execution failure or inconsistency, and to re-execute a refined structured query to obtain updated query results;

a result aggregation and visualization agent configured to aggregate query results to form validated insight data associated with corresponding validated hypotheses, and generate visualization code for representing at least a portion of the validated hypotheses and the query results;

a report generation agent configured to compile a business insight report;

a feedback agent configured to evaluate individual business insights represented in the business insight report according to a plurality of scoring dimensions to obtain a respective feedback score for each of the individual business insights; and a refinement agent configured to refine subsequent operation of the one or more Artificial Intelligence agents.

15. The system of claim 14, further comprising a shared state repository accessed by the Artificial Intelligence agent.

16. The system of claim 14, wherein the hypothesis generation agent is configured to instantiate hypothesis templates that describe potential metrics, correlations, trends, anomalies, or risk conditions across the plurality of structured data tables, including at least one of utilization analysis, cost analysis, skills-gap analysis, risk analysis, or opportunity analysis.

17. The system of claim 14, wherein the query debugging agent is configured to detect, as the execution failure or inconsistency, at least one of a syntax error, an invalid join condition, a missing data condition, or a data-type mismatch associated with the at least one structured query, and to generate a revised structured query that corrects a detected error while maintaining an intended analytical meaning of the corresponding candidate business insight hypothesis.

18. The system of claim 14, wherein the visualization generation agent is configured to select, based on characteristics of the validated insight data, a visualization type from a plurality of visualization types including at least a bar chart, a line chart, or a pie chart, to generate executable visualization code for the selected visualization type, and to store the visualization code in association with corresponding ones of the validated hypotheses and the query results for reuse in subsequent business insight reports.

19. The system of claim 14, wherein the feedback agent is configured to compute, for each of the individual business insights, scores for at least relevance, actionability, clarity, accuracy, and business impact, to combine the scores to obtain the respective feedback score, and wherein the refinement agent is configured to prioritize refinement of hypotheses, structured queries, or visualizations for the individual business insights based on the respective feedback scores.

20. The system of claim 14, further comprising one or more integration interfaces configured to communicate, via one or more application programming interfaces, with external business-intelligence tools or external structured data systems, the integration interfaces being configured to retrieve the plurality of structured data tables from the external systems and to export at least a portion of the business insight report or the one or more visualizations to the external business-intelligence tools.

\*    \*    \*    \*    \*